US011693667B2

(12) United States Patent  
Patterson et al.

(10) Patent No.: US 11,693,667 B2  
(45) Date of Patent: Jul. 4, 2023

(54) GRAPHICS PROCESSING UNIT SYSTEMS FOR PERFORMING DATA ANALYTICS OPERATIONS IN DATA SCIENCE

(71) Applicant: NVIDIA Corporation, Santa Clara, CA (US)

(72) Inventors: Joshua Patterson, Brookhaven, GA (US); Leeann Chau Tuyet Dang, San Jose, CA (US); Keith Jason Kraus, Plainsboro, NJ (US); Allan Rabbitt Enemark, San Jose, CA (US); Frank Joseph Eaton, Austin, TX (US); Bradley Stuart Rees, Wesley Chapel, FL (US); Michael Evan Wendt, Hyattsville, MD (US); Mark Jason Harris, Larnook (AU)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/692,571

(22) Filed: Mar. 11, 2022

(65) Prior Publication Data

US 2022/0197664 A1 Jun. 23, 2022

Related U.S. Application Data

(63) Continuation of application No. 16/596,755, filed on Oct. 8, 2019, now Pat. No. 11,307,863.

(Continued)

(51) Int. Cl.
*G06F 13/16* (2006.01)
*G06N 20/00* (2019.01)
(Continued)

(52) U.S. Cl.
CPC ........ *G06F 9/3881* (2013.01); *G06F 9/30043* (2013.01); *G06F 9/3822* (2013.01); *G06F 13/1663* (2013.01); *G06N 3/02* (2013.01); *G06N 3/08* (2013.01); *G06N 20/00* (2019.01); *G06T 1/20* (2013.01); *G06F 2009/3883* (2013.01)

(58) Field of Classification Search
None
See application file for complete search history.

(56) References Cited

U.S. PATENT DOCUMENTS 8,031,197 B1 * 10/2011 Williams .................. G06T 1/20  
    345/501  
10,318,474 B1 * 6/2019 Krasner .............. G06F 13/1663  
(Continued)

*Primary Examiner* — Joni Hsu  
(74) *Attorney, Agent, or Firm* — Taylor English Duma L.L.P.

(57) ABSTRACT

Systems and methods are provided for efficiently performing processing intensive operations, such as those involving large volumes of data, that enable accelerated processing time of these operations. In at least one embodiment, a system includes a graphics processor unit (GPU) including a memory and a plurality of cores. The plurality of cores perform a plurality of data analytics operations on a respectively allocated portion of a dataset, each of the plurality of cores using only the memory to store data input for each of the plurality of data analytics operations performed by the plurality of cores. The data storage for the plurality of data analytics operations performed by the plurality of cores is also provided solely by the memory.

20 Claims, 21 Drawing Sheets

Related U.S. Application Data

(60) Provisional application No. 62/742,828, filed on Oct. 8, 2018.

(51) Int. Cl.
  *G06N 3/02* (2006.01)
  *G06F 9/38* (2018.01)
  *G06N 3/08* (2023.01)
  *G06F 9/30* (2018.01)
  *G06T 1/20* (2006.01)

(56) References Cited

U.S. PATENT DOCUMENTS

| | | | |
|---|---|---|---|
| 10,810,491 B1 | 10/2020 | Xia et al. | |
| 2008/0134156 A1* | 6/2008 | Osminer | G06F 9/44589 |
| | | | 717/140 |
| 2008/0291209 A1* | 11/2008 | Sureka | G09G 5/39 |
| | | | 345/531 |
| 2010/0138376 A1 | 6/2010 | Avis et al. | |
| 2010/0153160 A1 | 6/2010 | Bezemer et al. | |
| 2012/0154373 A1* | 6/2012 | Finocchio | G06N 5/046 |
| | | | 345/419 |
| 2015/0081937 A1 | 3/2015 | Wong et al. | |
| 2016/0005128 A1* | 1/2016 | White | G06Q 40/04 |
| | | | 705/36 R |
| 2016/0019458 A1 | 1/2016 | Kaufhold et al. | |
| 2016/0188692 A1 | 6/2016 | Tsumura et al. | |
| 2017/0109899 A1* | 4/2017 | Lee | H04N 1/628 |
| 2019/0005187 A1 | 1/2019 | Costello et al. | |
| 2019/0012768 A1 | 1/2019 | Tafazoli Bilandi et al. | |
| 2019/0041484 A1 | 2/2019 | Mishra et al. | |
| 2019/0122141 A1 | 4/2019 | Zhen et al. | |
| 2019/0342611 A1 | 11/2019 | Qiang | |
| 2020/0012919 A1* | 1/2020 | Bathaee | G06Q 50/18 |
| 2020/0027020 A1 | 1/2020 | Kamesawa et al. | |
| 2020/0278646 A1 | 9/2020 | Sakiyama et al. | |

* cited by examiner

ID
GRAPHICS PROCESSING UNIT SYSTEMS FOR PERFORMING DATA ANALYTICS OPERATIONS IN DATA SCIENCE

CROSS-REFERENCE TO RELATED APPLICATIONS

This application is a continuation of U.S. patent application Ser. No. 16/596,755, filed Oct. 8, 2019, now U.S. Pat. No. 11,307,863, which itself claims priority to U.S. Provisional Application No. 62/742,828, filed Oct. 8, 2018, the entire contents of which are incorporated herein by reference in their entirety.

REFERENCE TO "COMPUTER PROGRAM LISTING APPENDIX"

A plurality of appendices is attached as part of the specification. Appendix A includes documentation and libraries related to RAPIDS cuDF and cuML as posted at https://docs.rapids.ai/api; Appendix B includes pandas documentation, libraries, objects, functions, and methods as posted at https://pandas.pydata.org/pandas-docs/version/0.24/reference/index.html; Appendix C includes scikit-learn API documentation, libraries, learn as posted at https://scikit-learn.org/stable/modules/classes.html; and Appendix D includes documentation and libraries related to RAPIDS cuDF and cuML as posted at Github: https://github.com/rapidsai/. Each of Appendix A, B, C, and D, is hereby incorporated by reference in their entireties.

FIELD

At least one embodiment pertains to computer processors. For example, at least one embodiment pertains to using graphic processing units for performing data analytics operations.

BACKGROUND

Data science extracts knowledge from large volumes of data commonly known as "big data." Big data often includes millions or billions of individual points of data that are extremely difficult to sort or categorize. As a result, statistical and machine learning algorithms are applied to the data to identify patterns and extract useful knowledge. For example, various types of clustering algorithms might be applied to sales data to reveal patterns in buying habits. Identification of these patterns may enable for example, shipping companies to reduce costs by co-locating products that are frequently purchased together. One of the cores of data science is the training of predictive models. Such models are used in various types of industries. For example, mortgage companies use predictive models to predict the risk of defaults or early payoffs. In another example, retail companies use the predictive models to forecast inventory to minimize losses and increase their margins. In a further example, hospitals use the predictive models to identify high risk patients.

Data science workflows are often divided into four phases. The first phase is preparing data. The second phase is applying statistical or machine learning algorithms to the data. The third phase is evaluating the results of the algorithms; and the fourth phase is deploying successful algorithms on live data stores. Each of these phases can be extraordinarily processor intensive, as well as extremely time and resource consuming when managing very large volumes of data, which tends to be computationally expensive. In addition, many computational issues exist today in the workflows. Computational performance is important especially since the results from applying the algorithms to live or real-time data must be fast enough to yield actionable information. Capabilities for a system to effectively deal with these issues and accelerate processing time can be improved.

DETAILED DESCRIPTION

Figure 1:
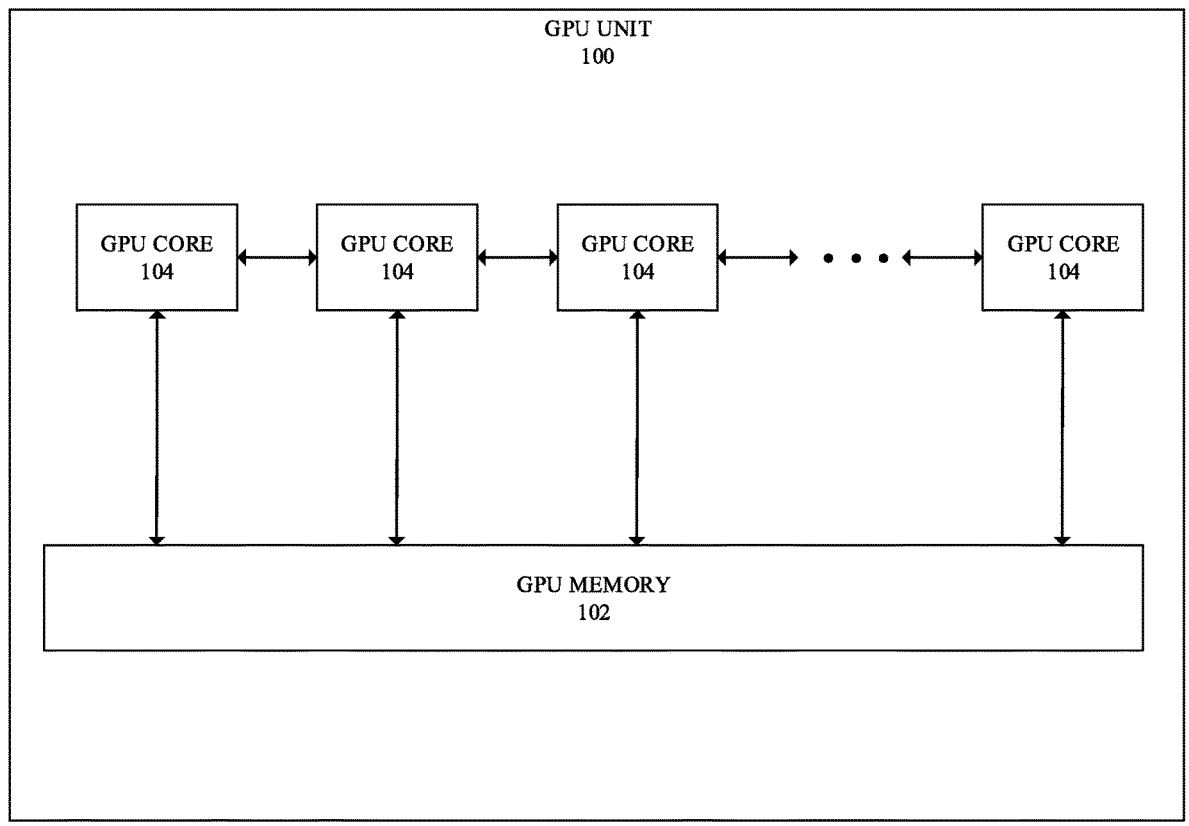
FIG. 1 illustrates a block diagram of a parallel processing system for data analytics operations according to at least one embodiment.

The present disclosure provides systems and methods for efficiently performing processing intensive operations, such as those involving large volumes of data, that enable accelerated processing time of these operations. The present disclosure is described in the context of processing intensive operations such as data analytics operations. However, it will be understood that the principles of the present disclosure are applicable to other types of operations, particularly those that implement processor intensive algorithms that can leverage parallel execution resources. Data analytics operations, such as those in data science workflows are conventionally executed using a general-purpose central processing unit (CPU), often leveraging multiple processor cores for parallelizing stages of data science workflows such as data loading, data manipulation and machine learning. An inherent drawback of a CPU and associated software is the limited capacity for parallelization of operations. In contrast, a graphics processing unit (GPU) and its associated software are designed and optimized for parallel processing, and have a much higher capacity for performing operations in parallel than CPUs. Commonly, A GPU being used for data intensive operations is directed by a CPU and relies on external processing and storage resources, which introduce additional processing steps and efficiency bottlenecks. After the data is loaded to the GPU, the data manipulation and machine learning phases are often processed externally from the GPU's parallel processing. Also, often the data used for these phases is stored externally from the GPU processor. Both communication and processing of data to and from the external processor tend to be both time and resource consuming when managing very large volumes of data. For example, in order to build the best predictive models, iterative training, evaluating, and testing of the models is required. Dozens of iterations are needed to train highly accurate predictive models. Today, generating feature sets for machine learning and training from such feature sets are slow due to these compute and memory bottlenecks. This makes it difficult to build (or deploy) accurate models with higher complexity or with larger datasets. Even if feature engineering and model training are accelerated, data transfer between the steps can still be a major bottleneck. To maximize throughput, every phase of the data science workflow must be simultaneously sped up.

The present disclosure provides a more efficient paradigm for leveraging the parallel processing architecture of GPUs to perform operations, such as data analytics operations, without the bottlenecks associated with reliance on external processing and storage resources in the execution of such operations. In at least one embodiment, in the present disclosure the data is completely stored in a GPU memory of a software and hardware platform, and this GPU memory is shared by various logic units in the platform for internally processing each of the data analytics operations. The data is accessed via the shared GPU memory in an analytics data format, which eliminates the need for data transfer between different logic units and enables interoperability with standard data science software, and data ingestion through appropriate application programming interfaces (APIs). Accordingly, the present disclosure provides for acceleration of the data analytics operations in each of the phases of the data science workflow are executed at very high speeds. These techniques are part of the NVIDIA RAPIDS platform, described in the appendices and, for example, https://medium.com/rapids-ai, which is hereby incorporated by reference.

FIG. 1 illustrates a block diagram of parallel processing system 100 for data analytics operations. In at least one embodiment, the system 100 includes a GPU including a memory 102 and a plurality of cores/processors 104. A GPU is a specialized electronic circuit designed to rapidly manipulate and alter memory to accelerate creation of images in a frame buffer intended for output to a display device. GPUs are widely used in embedded systems, mobile phones, personal computers, workstations, and game consoles among other devices. In at least one embodiment, system 100 provides a hardware and software platform that includes one or more logic units (se FIG. 2), which function to perform data analytics operations solely in the GPU. Each of the GPU cores 104 communicate bidirectionally with each other and with the memory 102. In at least one embodiment, each of these cores 104 perform a plurality of data analytics operations on their respective allocated portion of a dataset. In at least one embodiment, only the memory 102 stores data input used for each of the data analytics operations performed by the cores 104 and provides data storage needs of the data analytics operations. Thus, the memory 102 is shared by each of the cores 104 in performing the data analytics operations within the GPU.

In at least one embodiment, the data analytics operations include any one or more of the following four phases: manage/prepare data (raw data), train the managed data, evaluate the trained data, and deploy on live data as described in detail below.

Figure 1A:
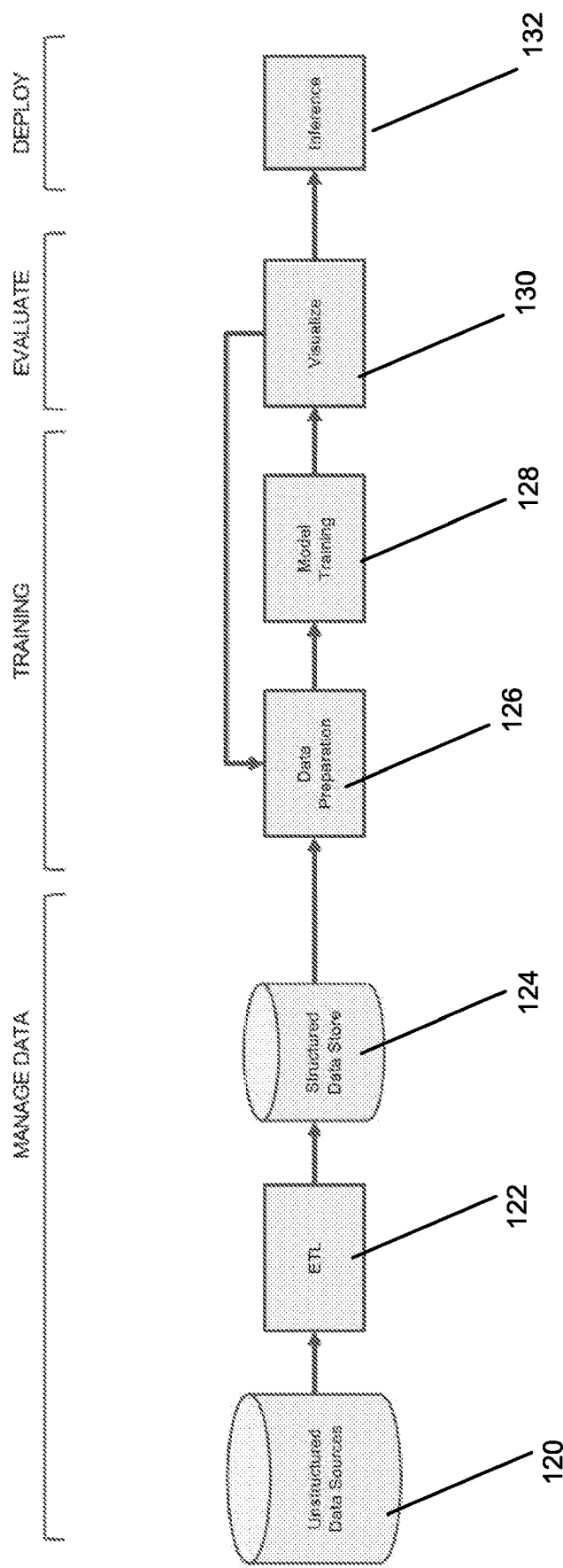
FIG. 1A illustrating the four phases of the data analytics operations performed by the GPU unit 100 of FIG. 1.

FIG. 1A is a block diagram of the GPU unit 100 illustrating the four phases of the data analytics operations performed by the GPU unit 100. In at least one embodiment, the first phase is managing data, e.g., raw data. In one example, the raw data is stored in unstructured data sources 120 and this data is extracted, transformed and loaded (ETL) 122 into a structured data store 124. In one example, the structured data store is the memory 102 (e.g., local memory in a GPU). In at least one embodiment, the second phase is training the managed data, which includes data preparation 126 and model training 128—which may include, without limitation, applying a plurality of algorithms such as statistical algorithms, machine learning algorithms, or both to the data. In at least one embodiment, the third phase includes evaluating the trained data. In one example, the evaluation includes visualizing 130 the trained data to evaluate the results of the algorithms. In at least one embodiment, the fourth phase is deployment of live or real-time data. In one example, deployment may include applying the inference 132 to the evaluated results to determine/identify the target algorithm among the plurality of algorithms for deployment on the real-time data. In one example, each of the GPU cores 104 may perform one or more of these phases of the data analytics operations on their respective allocated portion of the dataset.

Figure 2:
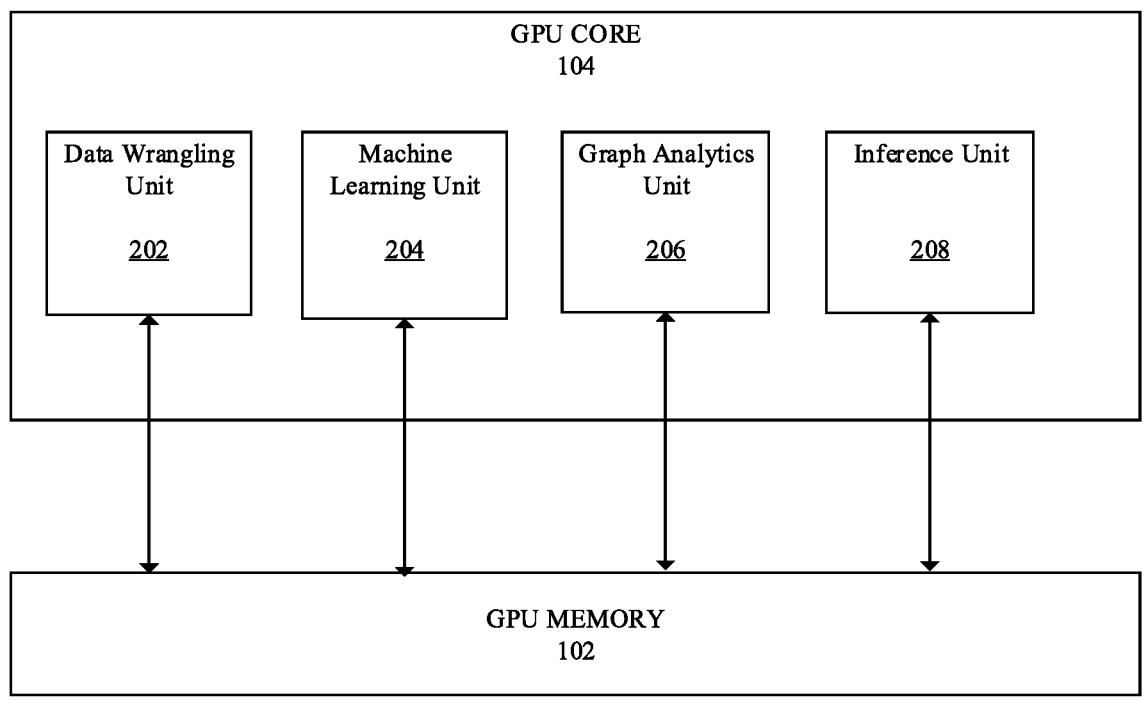
FIG. 2 illustrates a block diagram of parallel processing in a graphical processing unit (GPU) core of FIG. 1 according to at least one embodiment.

FIG. 2 illustrates a block diagram of a GPU core 104 for parallel processing data analytics operations utilizing the four phases as discussed above. In at least one embodiment, the GPU core 104 includes a data wrangling unit, 202, a machine learning unit 204, a graph analysis unit 206 and an inference unit 208 to perform the four phases of the data analytics operations as described in detail herein below.

In at least one embodiment, during the first phase of data preparation, the data wrangling unit 202 accesses, transforms and loads all data solely into the memory 102. In one example, the GPU cores 104 extract different types of data. In another example, the GPU cores 104 receive the different types of data. The data is accessed from multiple various data sources, which may store or format the data different from each other. Also, such formats may be structured, unstructured or semi-structured. Unstructured data lacks a pre-defined organization and many times includes data items that are not compatible with one another. For example, text such as names, addresses, and dates may be in inconsistent locations or formats throughout a data store. The data wrangling unit 202 transforms underlying data from unstructured to structured data.

In at least one embodiment, the data wrangling unit 202 combines the different formats of data from multiple different sources that are stored or formatted inconsistently. For example, data may be available in relational databases, flat text or CSV files, or a variety of other kinds of structured or semi-structured formats such as JSON or XML formats. Some data sources may have consistent and predictable errors that differ from other sources. In addition, each of the sources often store different types of data including but not limited to text, image, audio and video. Often the type of data from different sources is very different itself and requires linking from text to video, or locations to names. In at least another embodiment, the data wrangling unit 202 links one type of the data to another type of data and/or converts one type of data format to another. Accordingly, the data wrangling unit 202 converts and links the data from many various sources into a single unified and structured data. The data wrangling unit 202 further stores this data completely only into the memory 102.

In at least one embodiment, during the second phase (statistical or machine learning), the machine learning unit 204 accesses the data via the shared memory 102 and applies appropriate machine or statistical learning algorithms to data to generate data results in order. In one example, the data results identify useful patterns. Any of a large variety of suitable statistical and machine learning algorithms including supervised and unsupervised algorithms may be employed, such as linear models, support vectors, regressions, clustering, dimensionality reduction, classification, deep learning neural networks, or anomaly detection. These algorithms may be applied on the entire data, or on a portion of the data. The machine learning unit 204 store data results of the algorithms solely in the memory 102.

In at least one embodiment, during the third phase, the graph analysis unit 206 accesses the memory 102 for the results of the algorithms and evaluates the results of each of the plurality of algorithms. In one example, the graph analysis unit 206 compares results and/or predictions against past data. In another example the graph analysis unit 206 visualizes the results to assess whether meaningful patterns have been identified. In one example, the graph analysis unit 206 categorizes or classifies each of the millions or billions of data points in the data according to their respective algorithm. The graph analysis unit 206 then displays the evaluation of the results of each of the plurality of algorithms in summary or visual form. In at least one embodiment, the graph analysis unit 206 stores the evaluations of each of the plurality of algorithms solely in the memory 102.

In at least one embodiment, during the fourth phase, the inference unit 208 accesses the stored evaluations from the memory 102 and determines a target algorithm among a plurality of the algorithms based on the evaluations. In at least one embodiment, the inference unit 208 stores the target algorithm in the memory 102. In one implementation, the GPU core 104 may perform iterative training, validating and testing of the data in the target algorithm to utilize for deployment on a live data.

In at least one embodiment, data stored in the memory 102 during each of the above described phases is communicated from the GPU unit 100 to other hardware/software components for reporting to users and/or processing the data for operations different from the data analytic operations described above.

In at least one embodiment, multiple separate GPUs 100 function to scale large volumes of data. In one embodiment, a GPU communicates with one or more GPUs when scaling large volumes of data. In one example, the GPU communicates with one or more GPU via intra-node channels (NVLink/Switch or PCIe) or inter-node channels (IB, RoCE, TCP, etc.). In another embodiment, a GPU does not communicate with another GPU when scaling large volumes of data. In at least one embodiment, large volumes of data is scaled nearly linearly across multiple separate GPUs. In at least one embodiment, the data analytics operations as described above functions to scale large volumes of data through multiple separate GPUs.

Figure 3:
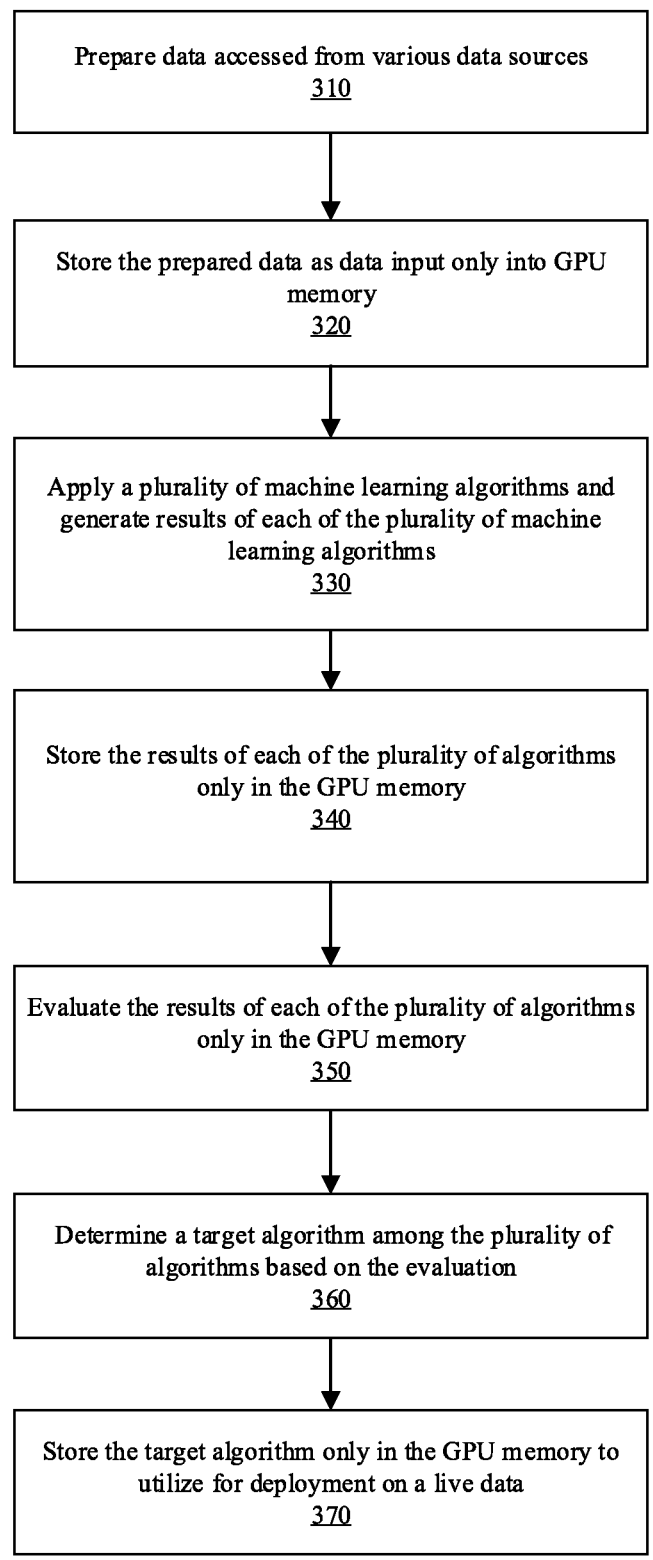
FIG. 3 is a flowchart illustrating a parallel processing for data analytics operations according to at least one embodiment.

FIG. 3 is a flowchart of illustrative steps illustrating a parallel processing for data analytics operations according to at least one embodiment. In at least one embodiment, a GPU core prepares data accessed from various sources (Step 310). The GPU core accesses and transforms all the data. In one example, the GPU extracts different types of data. In another example, the GPU receives the different types of data. The data is accessed from multiple various data sources, which may store or format the data different from each other. Also, such formats may be structured, unstructured or semi-structured. In one example, the different formats of data from multiple different sources are combined. In addition, each of the sources often store different types of data including but not limited to text, image, audio and video. In another example, one type of the data is linked to another type of data and/or converted from one type of data format to another. Accordingly, the data is converted and linked from many various sources into a single unified and structured data. In at least one embodiment, the GPU core stores the prepared data as data input only into a memory of a GPU (Step 320). In at least one embodiment, the GPU core applies a plurality of statistical or machine learning algorithms to the stored data in the memory and generates results of the algorithms (Step 330). Any of a large variety of suitable statistical and machine learning algorithms including supervised and unsupervised algorithms may be employed, such as linear models, support vectors, regressions, clustering, dimensionality reduction, classification, deep learning neural networks, or anomaly detection. These algorithms may be applied on the entire data, or on a portion of the data. In at least one embodiment, the GPU core stores the results of each of the plurality of algorithms only in the memory (Step 340). In at least one embodiment, the GPU core evaluates the results of each of the plurality of the algorithms (350). In one example, the GPU core utilizes the graph analytics unit to compares results and/or predictions against past data. In another example the GPU core utilizes the graph analytics unit to visualize the results. In one example, the GPU core utilizes the graph analytics unit to display the evaluation of the results of each of the plurality of algorithms in summary or visual form. In at least one embodiment, the GPU core determines the target algorithm based on the evaluation (360). In at least one embodiment, the GPU core stores the target algorithm only in the memory of the GPU (shared across all GPU cores) to utilize for deployment on a live data (370).

In one embodiment, the parallel processing of the data analytics operations by GPU unit as described above is used by other systems/devices. For example, a computer that accesses a software as service platform (SaaS platform) leverages the GPU unit for performing big data analysis. Many of these other systems/devices are used by industries such as retail, finance and research. For example, the acceleration of creation of the model training and visualization phases help financial experts assess trends, identify risks and ensure better information for prospective planning. In another example, the data analytic operations help address highly complex business challenges, such as predicting credit card fraud, forecasting retail inventory and understanding customer buying behavior. Some other use cases in various systems/devices can also be found in https://medium.com/rapids-ai, which is hereby incorporated by reference.

Computer Systems

Figure 4:
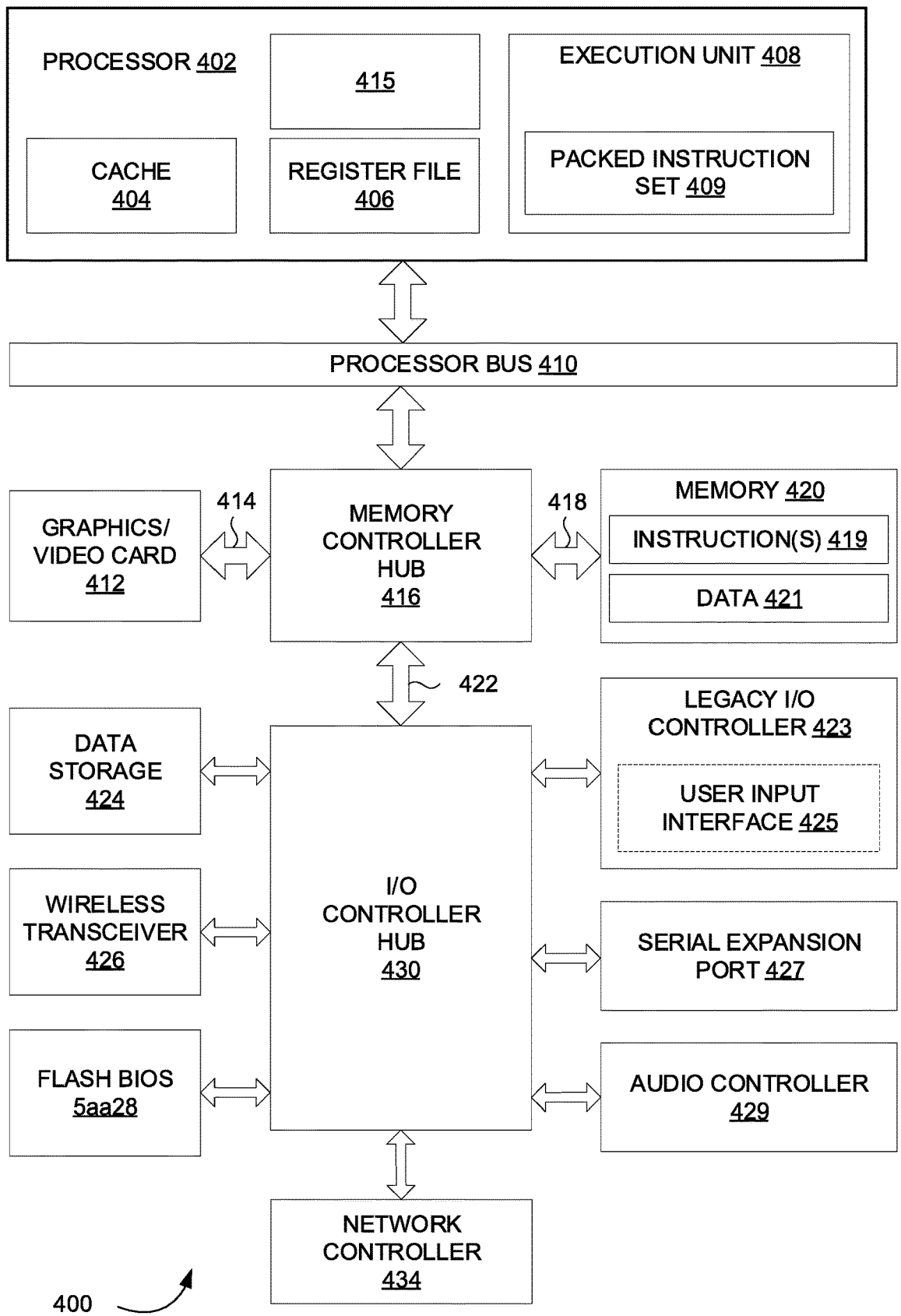
FIG. 4 is a block diagram illustrating a computer system, according to at least one embodiment.

FIG. 4 is a block diagram illustrating an exemplary computer system, which may be a system with interconnected devices and components, a system-on-a-chip (SOC) or some combination thereof 400 formed with a processor that may include execution units to execute an instruction, according to at least one embodiment. In at least one embodiment, computer system 400 may include, without limitation, a component, such as a processor 402 to employ execution units including logic to perform algorithms for process data, in accordance with present disclosure, such as in embodiment described herein. In at least one embodiment, computer system 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 400 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 400 may include, without limitation, processor 402 that may include, without limitation, one or more execution units 408 to perform machine learning model training and/or inferencing according to techniques described herein. In at least one embodiment, system 400 is a single processor desktop or server system, but in another embodiment system 400 may be a multiprocessor system. In at least one embodiment, processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 402 may be coupled to a processor bus 410 that may transmit data signals between processor 402 and other components in computer system 400.

In at least one embodiment, processor 402 may include, without limitation, a Level 1 ("L1") internal cache memory ("cache") 404. In at least one embodiment, processor 402 may have a single internal cache or multiple levels of internal cache, for example the memory 102. In at least one embodiment, cache memory may reside external to processor 402. Other embodiments may also include a combination of both internal and external caches depending on particular implementation and needs. In at least one embodiment, register file 406 may store different types of data in various registers including, without limitation, integer registers, floating point registers, status registers, and instruction pointer register.

In at least one embodiment, execution unit 408, including, without limitation, logic to perform integer and floating point operations, also resides in processor 402. Processor 402 may also include a microcode ("ucode") read only memory ("ROM"), for example the memory 102 that stores microcode for certain macro instructions. In at least one embodiment, execution unit 408 may include logic to handle a packed instruction set 409. In at least one embodiment, by including packed instruction set 409 in instruction set of a general-purpose processor 402, along with associated circuitry to execute instructions, operations used by many multimedia applications may be performed using packed data in a general-purpose processor 402. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 408 may also be used in microcontrollers, embedded processors, graphics devices, DSPs, and other types of logic circuits. In at least one embodiment, computer system 400 may include, without limitation, a memory 420. In at least one embodiment, memory 420 may be implemented as a Dynamic Random Access Memory ("DRAM") device, a Static Random Access Memory ("SRAM") device, flash memory device, or other memory device. The memory 420, for example being the memory 102. Memory 420 may store instruction(s) 419 and/or data 421 represented by data signals that may be executed by processor 402.

In at least one embodiment, system logic chip may be coupled to processor bus 410 and memory 420. In at least one embodiment, system logic chip may include, without limitation, a memory controller hub ("MCH") 416, and processor 402 may communicate with MCH 416 via processor bus 410. In at least one embodiment, MCH 416 may provide a high bandwidth memory path 418 to memory 420 for instruction and data storage and for storage of graphics commands, data and textures. In at least one embodiment, MCH 416 may direct data signals between processor 402, memory 420, and other components in computer system 400 and to bridge data signals between processor bus 410, memory 420, and a system I/O 422. In at least one embodiment, system logic chip may provide a graphics port for coupling to a graphics controller. In at least one embodiment, MCH 416 may be coupled to memory 420 through a high bandwidth memory path 418 and graphics/video card 47 may be coupled to MCH 416 through an Accelerated Graphics Port ("AGP") interconnect 414.

In at least one embodiment, computer system 400 may use system I/O 422 that is a proprietary hub interface bus to couple MCH 416 to I/O controller hub ("ICH") 430. In at least one embodiment, ICH 430 may provide direct connections to some I/O devices via a local I/O bus. In at least one embodiment, local I/O bus may include, without limitation, a high-speed I/O bus for connecting peripherals to memory 420, chipset, and processor 402. Examples may include, without limitation, an audio controller 429, a firmware hub ("flash BIOS") 428, a wireless transceiver 426, a data storage 424, a legacy I/O controller 423 containing user input and keyboard interfaces, a serial expansion port 427, such as Universal Serial Bus ("USB"), and a network controller 434. data storage 424 may comprise a hard disk drive, a floppy disk drive, a CD-ROM device, a flash memory device, or other mass storage device.

In at least one embodiment, FIG. 4 illustrates a system, which includes interconnected hardware devices or "chips", whereas in other embodiments, FIG. 4 may illustrate an exemplary System on a Chip ("SoC"). In at least one embodiment, devices illustrated in FIG. cc may be interconnected with proprietary interconnects, standardized interconnects (e.g., PCIe) or some combination thereof. In at least one embodiment, one or more components of system 400 are interconnected using compute express link (CXL) interconnects.

Data analytics logic 415 are used to perform data analytics operations associated with one or more embodiments. Details regarding data analytics logic 415 are provided in conjunction with FIGS. 4 and/or 9. In at least one embodiment, data analytics logic 415 may be used in the system illustrated by FIG. 4 for data analytics operations related to data transformation, data loading, machine learning, heuristic algorithms probabilistic algorithms, linear models, support vectors, regressions, clustering, dimensionality reduction, classification and/or deep learning algorithms based, at least in part, on weight parameters calculated using neural network training operations, neural network functions and/or architectures, or neural network use cases described herein.

In at least one embodiment, data analytics logic 415 of computer system 400 may execute processes and calculations to implement system 100. In at least one embodiment, memory 420 may store instructions for implementing networks of system 100, to perform data analytic operations. Data analytics logic 415 may retrieve these stored instructions and data stored only in the memory of the GPU unit to execute system 100 and perform data analytic operations.

Figure 5:
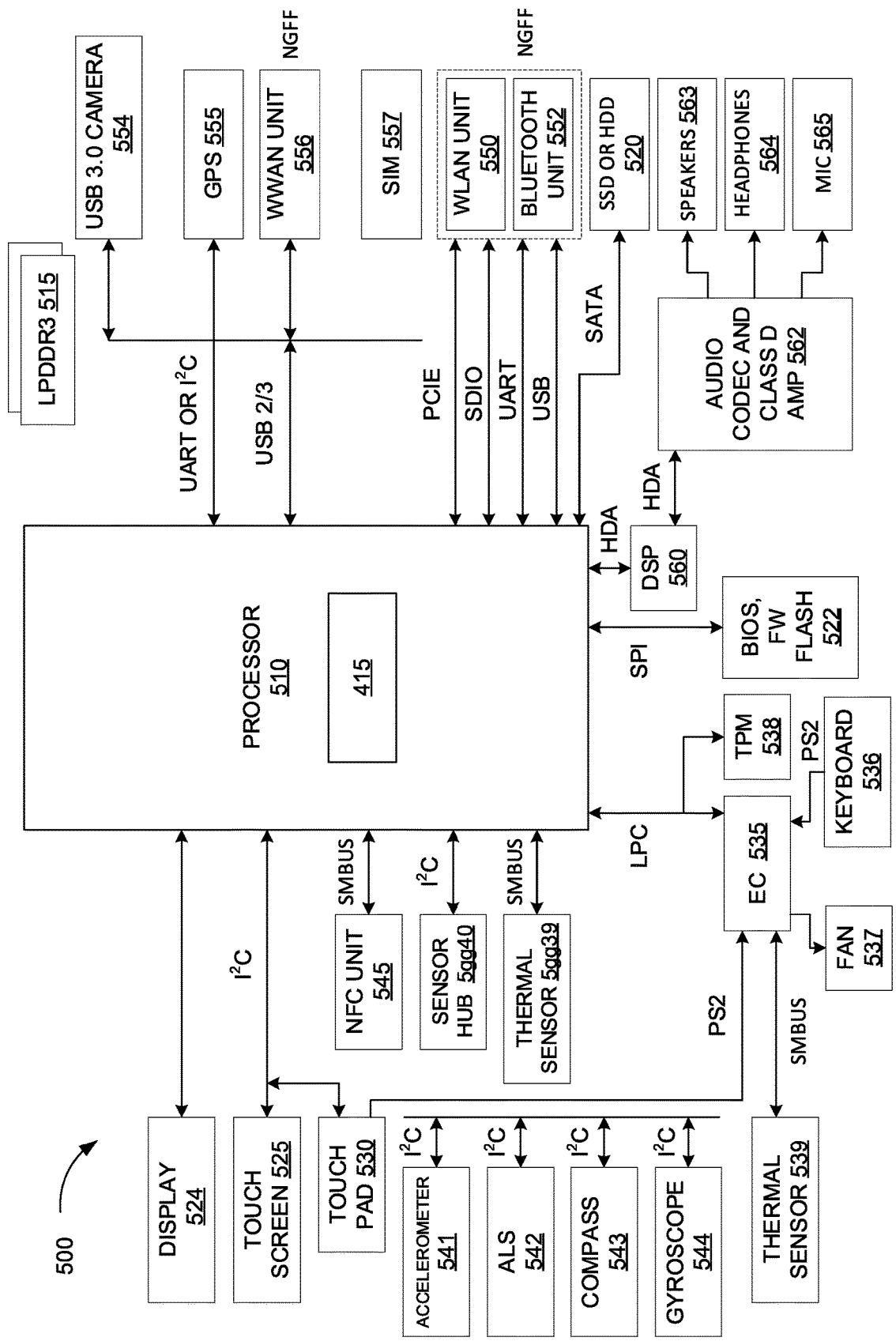
FIG. 5 is a block diagram illustrating computer system, according to at least one embodiment.

FIG. 5 is a block diagram illustrating an electronic device 500 for utilizing a processor 510, according to at least one embodiment. In at least one embodiment, electronic device 500 may be, for example and without limitation, a notebook, a tower server, a rack server, a blade server, a laptop, a desktop, a tablet, a mobile device, a phone, an embedded computer, or any other suitable electronic device.

In at least one embodiment, system 500 may include, without limitation, processor 510 communicatively coupled to any suitable number or kind of components, peripherals, modules, or devices. In at least one embodiment, processor 510 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 5 illustrates a system, which includes interconnected hardware devices or "chips", whereas in other embodiments, FIG. 5 may illustrate an exemplary System on a Chip ("SoC"). In at least one embodiment, devices illustrated in FIG. 5 may be interconnected with proprietary interconnects, standardized interconnects (e.g., PCIe) or some combination thereof. In at least one embodiment, one or more components of FIG. 5 are interconnected using compute express link (CXL) interconnects.

In at least one embodiment, FIG. 5 may include a display 524, a touch screen 525, a touch pad 530, a Near Field Communications unit ("NFC") 545, a sensor hub 540, a thermal sensor 546, an Express Chipset ("EC") 535, a Trusted Platform Module ("TPM") 538, BIOS/firmware/flash memory ("BIOS, FW Flash") 522, a DSP 560, a drive ("SSD or HDD") 520 such as a Solid State Disk ("SSD") or a Hard Disk Drive ("HDD"), a wireless local area network unit ("WLAN") 550, a Bluetooth unit 552, a Wireless Wide Area Network unit ("WWAN") 556, a Global Positioning System (GPS) 555, a camera ("USB 3.0 camera") 554 such as a USB 3.0 camera, or a Low Power Double Data Rate ("LPDDR") memory unit ("LPDDR3") 515 implemented in, for example, LPDDR3 standard. These components may each be implemented in any suitable manner.

In at least one embodiment, other components may be communicatively coupled to processor 510 through components discussed above. In at least one embodiment, an accelerometer 541, Ambient Light Sensor ("ALS") 542, compass 543, and a gyroscope 544 may be communicatively coupled to sensor hub 540. In at least one embodiment, thermal sensor 535, a fan 537, a keyboard 546, and a touch pad 530 may be communicatively coupled to EC 535. In at least one embodiment, speaker 563, a headphones 564, and a microphone ("mic") 565 may be communicatively coupled to an audio unit ("audio codec and class d amp") 564, which may in turn be communicatively coupled to DSP 560. In at least one embodiment, audio unit 564 may include, for example and without limitation, an audio coder/decoder ("codec") and a class D amplifier. In at least one embodiment, SIM card ("SIM") 557 may be communicatively coupled to WWAN unit 556. In at least one embodiment, components such as WLAN unit 550 and Bluetooth unit 552, as well as WWAN unit 556 may be implemented in a Next Generation Form Factor ("NGFF").

Data analytics logic 415 are used to perform data analytics operations associated with one or more embodiments. Details regarding data analytics logic 415 are provided in conjunction with FIGS. 8 and/or 5. In at least one embodiment, the data analytics logic 415 may be used in the system of FIG. 5 for data analytics operations related to data transformation, data loading, machine learning, heuristic algorithms probabilistic algorithms, linear models, support vectors, regressions, clustering, dimensionality reduction, classification and/or deep learning algorithms based, at least in part, on weight parameters calculated using neural network training operations, neural network functions and/or architectures, or neural network use cases described herein.

In at least one embodiment, data analytics logic 415 of processor 510 may execute processes and calculations to implement system 100. That is, memory such as BIOS/firmware/flash memory ("BIOS, FW Flash") 522 and/or drive ("SSD or HDD") 520 may store instructions for implementing networks of system 100 to perform data analytics operations. In at least one embodiment, data analytics logic 415 may retrieve these stored instructions, and data stored only in the memory of GPU unit to perform data analytics operations according to system 100.

Figure 6:
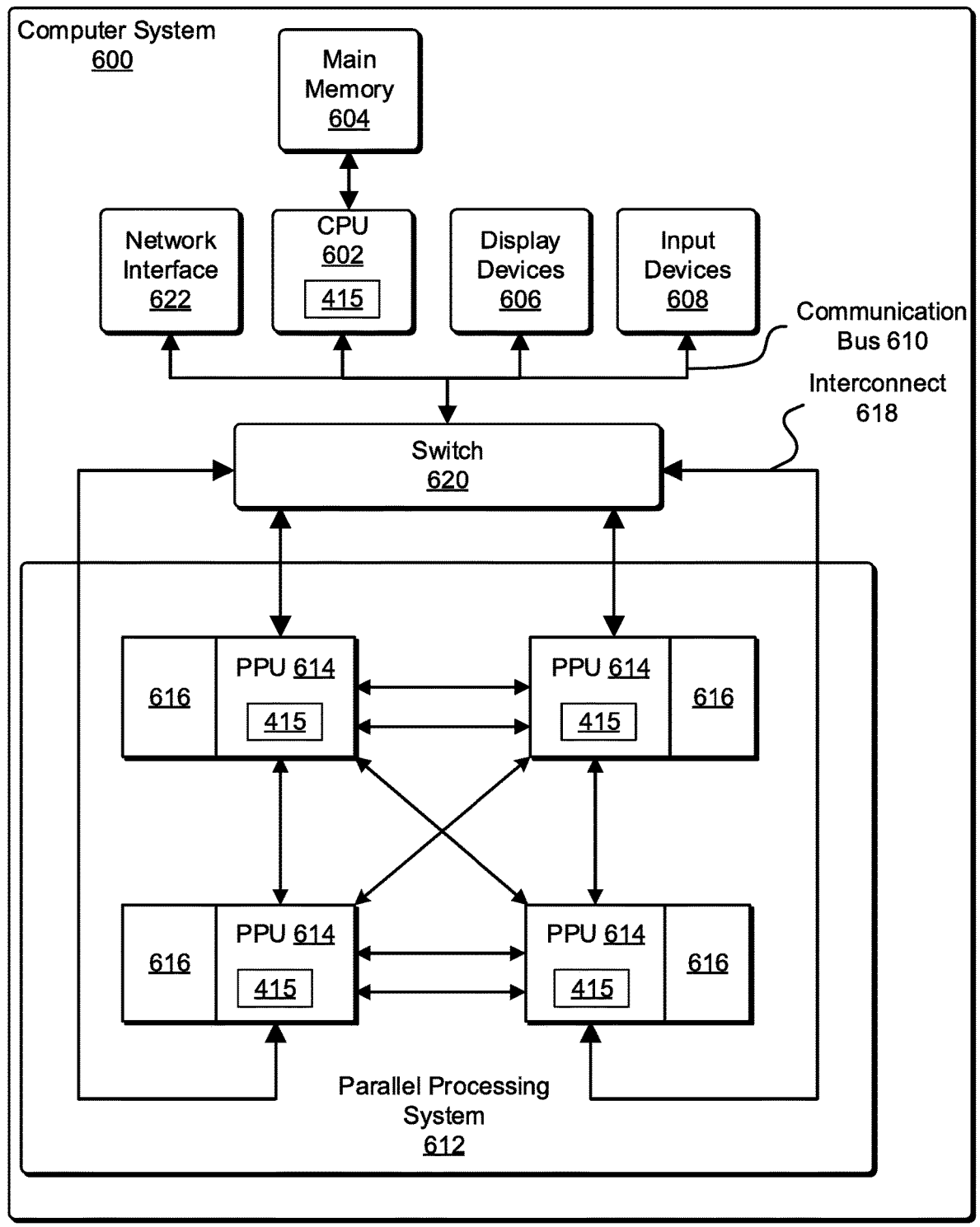
FIG. 6 illustrates a computer system, according to at least one embodiment.

FIG. 6 illustrates a computer system 600, according to at least one embodiment. In at least one embodiment, computer system 600 is configured to implement various processes and methods described throughout this disclosure.

In at least one embodiment, computer system 600 comprises, without limitation, at least one central processing unit ("CPU") 602 that is connected to a communication bus 610 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 600 includes, without limitation, a main memory 604 and control logic (e.g., implemented as hardware, software, or a combination thereof) and data are stored in main memory 604 which may take form of random access memory ("RAM"). In at least one embodiment, a network interface subsystem ("network interface") 622 provides an interface to other computing devices and networks for receiving data from and transmitting data to other systems from computer system 600.

In at least one embodiment, computer system 600, in at least one embodiment, includes, without limitation, input devices 608, parallel processing system 67, and display devices 606 which can be implemented using a conventional cathode ray tube ("CRT"), liquid crystal display ("LCD"), light emitting diode ("LED"), plasma display, or other suitable display technologies. In at least one embodiment, user input is received from input devices 608 such as keyboard, mouse, touchpad, microphone, and more. In at least one embodiment, each of foregoing modules can be situated on a single semiconductor platform to form a processing system.

In at least one embodiment, computer programs in form of machine-readable executable code or computer control logic algorithms are stored in main memory 604 and/or secondary storage. Computer programs, if executed by one or more processors, enable system 600 to perform various functions in accordance with at least one embodiment. memory 604, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 602; parallel processing system 67; an integrated circuit capable of at least a portion of capabilities of both CPU 602; parallel processing system 67; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 600 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 67 includes, without limitation, a plurality of parallel processing units ("PPUs") 614 and associated memories 616. In at least one embodiment, PPUs 614 are connected to a host processor or other peripheral devices via an interconnect 618 and a switch 620 or multiplexer. In at least one embodiment, parallel processing system 67 distributes computational tasks across PPUs 614 which can be parallelizable—for example, as part of distribution of computational tasks across multiple graphics processing unit ("GPU") thread blocks. In at least one embodiment, memory is shared and accessible (e.g., for read and/or write access) across some or all of PPUs 614, although such shared memory may incur performance penalties relative to use of local memory and registers resident to a PPU 614. In at least one embodiment, operation of PPUs 614 is synchronized through use of a command such as syncthread(s), wherein all threads in a block (e.g., executed across multiple PPUs 614) to reach a certain point of execution of code before proceeding Data analytics logic 415 are used to perform data analytics operations associated with one or more embodiments. Details regarding data analytics logic 415 are provided in FIG. 6. In at least one embodiment, data analytics operations logic 415 may be used in the system of FIG. 6 for data analytics operations related to data transformation, data loading, machine learning, heuristic algorithms probabilistic algorithms, linear models, support vectors, regressions, clustering, dimensionality reduction, classification and/or deep learning algorithms based, at least in part, on weight parameters calculated using neural network training operations, neural network functions and/or architectures, or neural network use cases described herein.

In at least one embodiment, data analytics logic 415 of computer system 600 may execute processes and calculations to implement system 100. In at least one embodiment, memory such as main memory 604 may store instructions for implementing networks of system 100, other data stored only in the memory of GPU for using the system 100 to perform data analytic operations. In at least one embodiment, data analytics logic 415 may retrieve these stored instructions, parameters and data stored in memory 604, to perform data analytics operations.

Figure 7A:
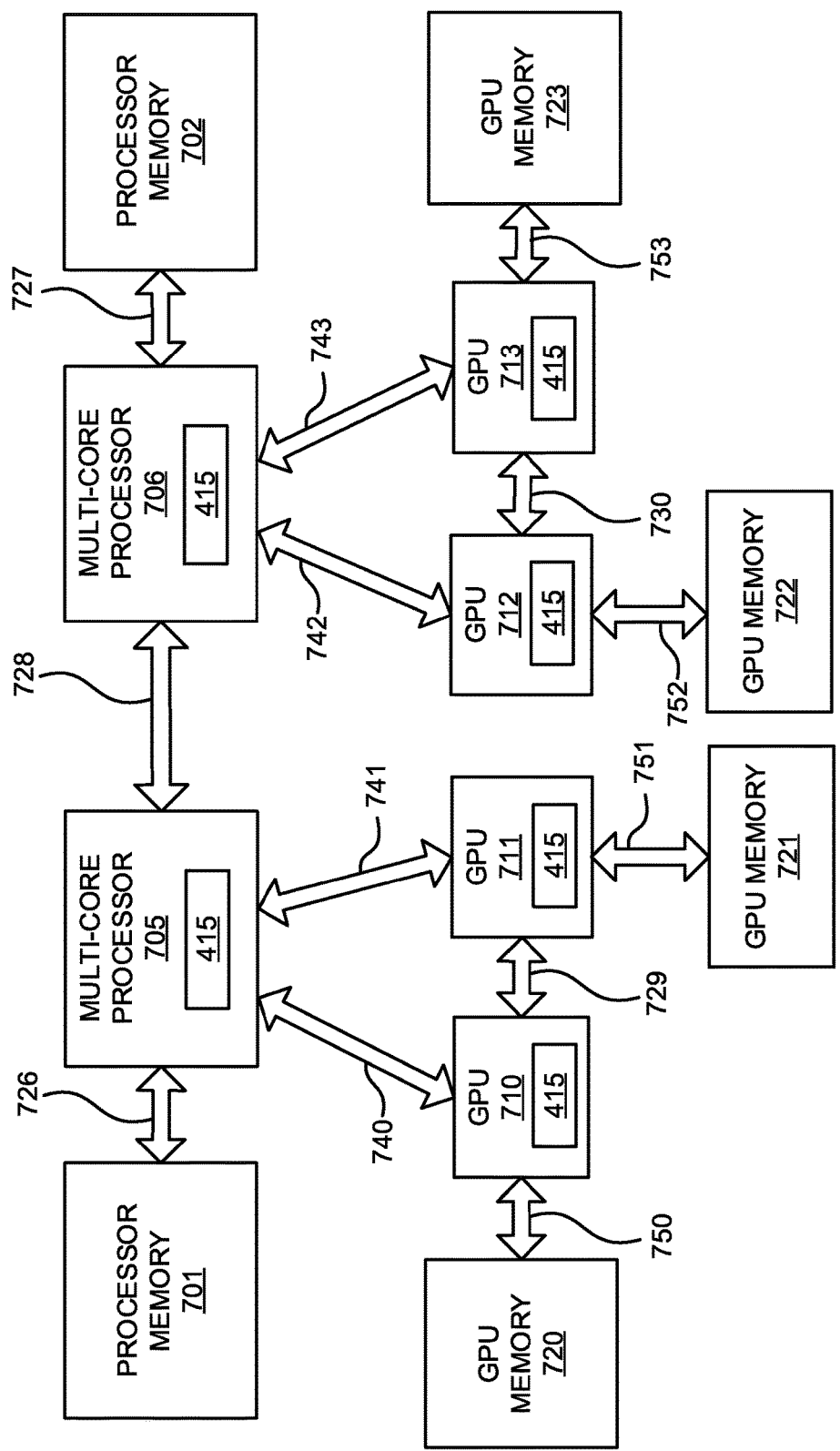
FIG. 7A illustrates a computer system, according to at least one embodiment.

FIG. 7A illustrates an exemplary architecture in which a plurality of GPUs 710-713 is communicatively coupled to a plurality of multi-core processors 705-706 over high-speed links 740-743 (e.g., buses, point-to-point interconnects, etc.). In one embodiment, high-speed links 740-743 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 710-713 are interconnected over high-speed links 729-730, which may be implemented using same or different protocols/links than those used for high-speed links 740-743. Similarly, two or more of multi-core processors 705-706 may be connected over high speed link 728 which may be symmetric multi-processor (SMP) buses operating at 20 GB/s, 30 GB/s, 70 GB/s or higher. Alternatively, all communication between various system components shown in FIG. 7A may be accomplished using same protocols/links (e.g., over a common interconnection fabric).

In one embodiment, each multi-core processor 705-706 is communicatively coupled to a processor memory 701-702, via memory interconnects 726-727, respectively, and each GPU 710-713 is communicatively coupled to GPU memory 720-723 over GPU memory interconnects 750-753, respectively. Memory interconnects 726-727 and 750-753 may utilize same or different memory access technologies. By way of example, and not limitation, processor memories 701-702 and GPU memories 720-723 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 701-702 may be volatile memory and another portion may be non-volatile memory (e.g., using a two-level memory (2LM) hierarchy).

As described below, although various processors 705-706 and GPUs 710-713 may be physically coupled to a particular memory 701-702, 720-723, respectively, a unified memory architecture may be implemented in which a same virtual system address space (also referred to as "effective address" space) is distributed among various physical memories. For example, processor memories 701-702 may each comprise 64 GB of system memory address space and GPU memories 720-723 may each comprise 32 GB of system memory address space (resulting in a total of 256 GB addressable memory in this example).

Figure 7B:
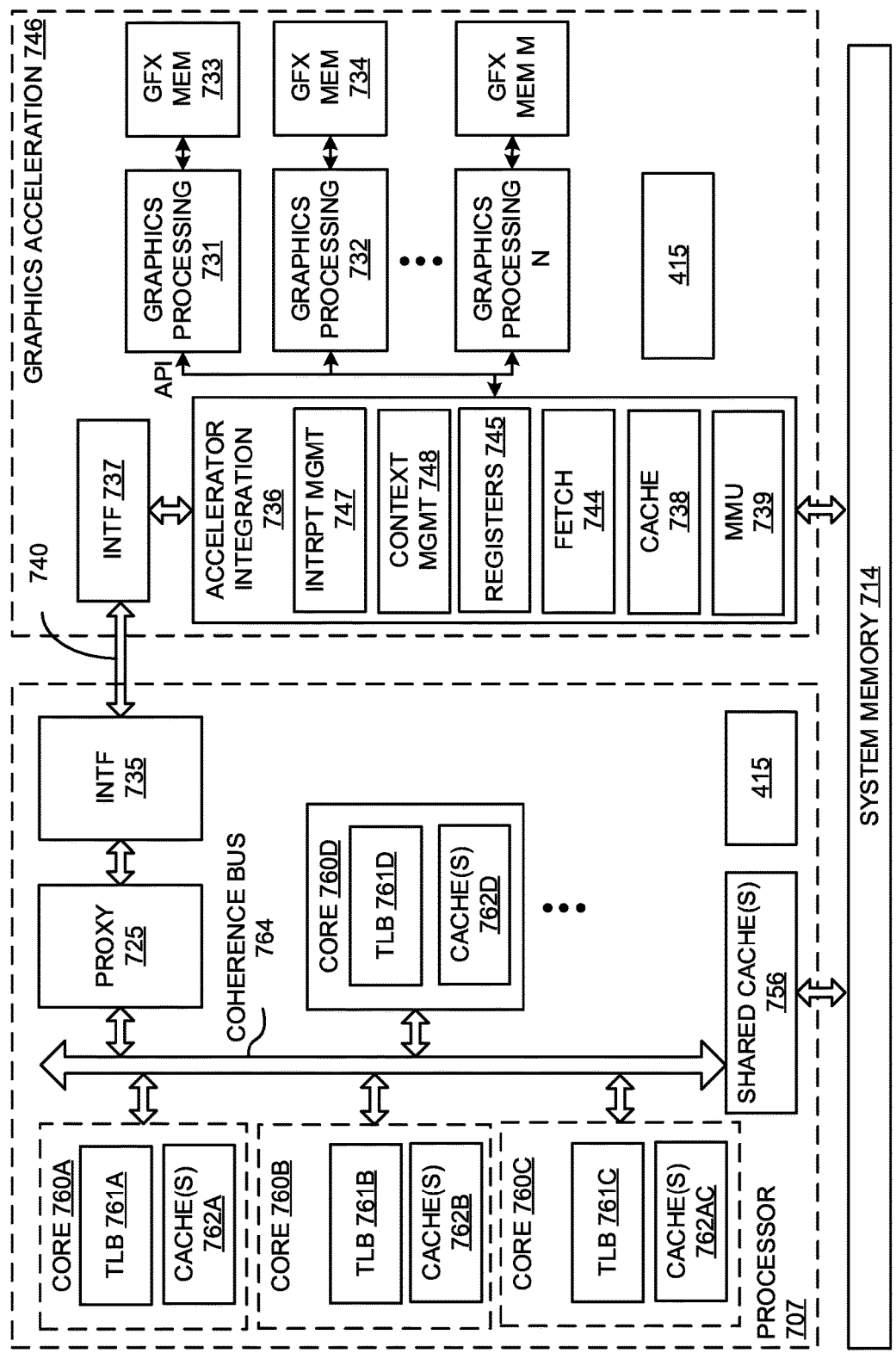
FIG. 7B illustrates a computer system, according to at least one embodiment.

FIG. 7B illustrates additional details for an interconnection between a multi-core processor 707 and a graphics acceleration module 746 in accordance with one exemplary embodiment. Graphics acceleration module 746 may include one or more GPU chips integrated on a line card which is coupled to processor 707 via high-speed link 740. Alternatively, graphics acceleration module 746 may be integrated on a same package or chip as processor 707.

In at least one embodiment, illustrated processor 707 includes a plurality of cores 760A-760D, each with a translation lookaside buffer 761A-761D and one or more caches 762A-762D. In at least one embodiment, cores 760A-760D may include various other components for executing instructions and processing data which are not illustrated. Caches 762A-762D may comprise level 1 (L1) and level 2 (L2) caches. In addition, one or more shared caches 756 may be included in caches 762A-762D and shared by sets of cores 760A-760D. For example, one embodiment of processor 707 includes 24 cores, each with its own L1 cache, twelve shared L2 caches, and twelve shared L3 caches. In this embodiment, one or more L2 and L3 caches are shared by two adjacent cores. Processor 707 and graphics acceleration module 746 connect with system memory 714, which may include processor memories 701-702 of FIG. 7A.

Coherency is maintained for data and instructions stored in various caches 762A-762D, 756 and system memory 714 via inter-core communication over a coherence bus 764. For example, each cache may have cache coherency logic/circuitry associated therewith to communicate to over coherence bus 764 in response to detected reads or writes to particular cache lines. In one implementation, a cache snooping protocol is implemented over coherence bus 764 to snoop cache accesses.

In one embodiment, a proxy circuit 725 communicatively couples graphics acceleration module 746 to coherence bus 764, allowing graphics acceleration module 746 to participate in a cache coherence protocol as a peer of cores 760A-760D. In particular, an interface 735 provides connectivity to proxy circuit 725 over high-speed link 740 (e.g., a PCIe bus, NVLink, etc.) and an interface 737 connects graphics acceleration module 746 to link 740.

In one implementation, an accelerator integration circuit 736 provides cache management, memory access, context management, and interrupt management services on behalf of a plurality of graphics processing engines 731, 732, N of graphics acceleration module 746. Graphics processing engines 731, 732, N may each comprise a separate graphics processing unit (GPU). Alternatively, graphics processing engines 731, 732, N may comprise different types of graphics processing engines within a GPU such as graphics execution units, media processing engines (e.g., video encoders/decoders), samplers, and blit engines. In at least one embodiment, graphics acceleration module 746 may be a GPU with a plurality of graphics processing engines 731-732, N or graphics processing engines 731-732, N may be individual GPUs integrated on a common package, line card, or chip.

In one embodiment, accelerator integration circuit 736 includes a memory management unit (MMU) 739 for performing various memory management functions such as virtual-to-physical memory translations (also referred to as effective-to-real memory translations) and memory access protocols for accessing system memory 714. MMU 739 may also include a translation lookaside buffer (TLB) (not shown) for caching virtual/effective to physical/real address translations. In one implementation, a cache 738 stores commands and data for efficient access by graphics processing engines 731-732, N. In one embodiment, data stored in cache 738 and graphics memories 733-734, M is kept coherent with core caches 762A-762D, 756 and system memory 714. As mentioned, this may be accomplished via proxy circuit 725 on behalf of cache 738 and memories 733-734, M (e.g., sending updates to cache 738 related to modifications/accesses of cache lines on processor caches 762A-762D, 756 and receiving updates from cache 738).

A set of registers 745 store context data for threads executed by graphics processing engines 731-732, N and a context management circuit 748 manages thread contexts. For example, context management circuit 748 may perform save and restore operations to save and restore contexts of various threads during contexts switches (e.g., where a first thread is saved and a second thread is stored so that a second thread can be execute by a graphics processing engine). For example, on a context switch, context management circuit 748 may store current register values to a designated region in memory (e.g., identified by a context pointer). It may then restore register values when returning to a context. In one embodiment, an interrupt management circuit 747 receives and processes interrupts received from system devices.

In one implementation, virtual/effective addresses from a graphics processing engine 731 are translated to real/physical addresses in system memory 714 by MMU 739. One embodiment of accelerator integration circuit 736 supports multiple (e.g., 4, 8, 16) graphics accelerator modules 746 and/or other accelerator devices. Graphics accelerator module 746 may be dedicated to a single application executed on processor 707 or may be shared between multiple applications. In one embodiment, a virtualized graphics execution environment is presented in which resources of graphics processing engines 731-732, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 736 performs as a bridge to a system for graphics acceleration module 746 and provides address translation and system memory cache services. In addition, accelerator integration circuit 736 may provide virtualization facilities for a host processor to manage virtualization of graphics processing engines 731-732, interrupts, and memory management.

Because hardware resources of graphics processing engines 731-732, N are mapped explicitly to a real address space seen by host processor 707, any host processor can address these resources directly using an effective address value. One function of accelerator integration circuit 736, in one embodiment, is physical separation of graphics processing engines 731-732, N so that they appear to a system as independent units.

In at least one embodiment, one or more graphics memories 733-734, M are coupled to each of graphics processing engines 731-732, N, respectively. Graphics memories 733-734, M store instructions and data being processed by each of graphics processing engines 731-732, N. Graphics memories 733-734, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 740, biasing techniques are used to ensure that data stored in graphics memories 733-734, M is data which will be used most frequently by graphics processing engines 731-732, N and preferably not used by cores 760A-760D (at least not frequently). Similarly, a biasing mechanism attempts to keep data needed by cores (and preferably not graphics processing engines 731-732, N) within caches 762A-762D, 756 of cores and system memory 714.

Figure 7C:
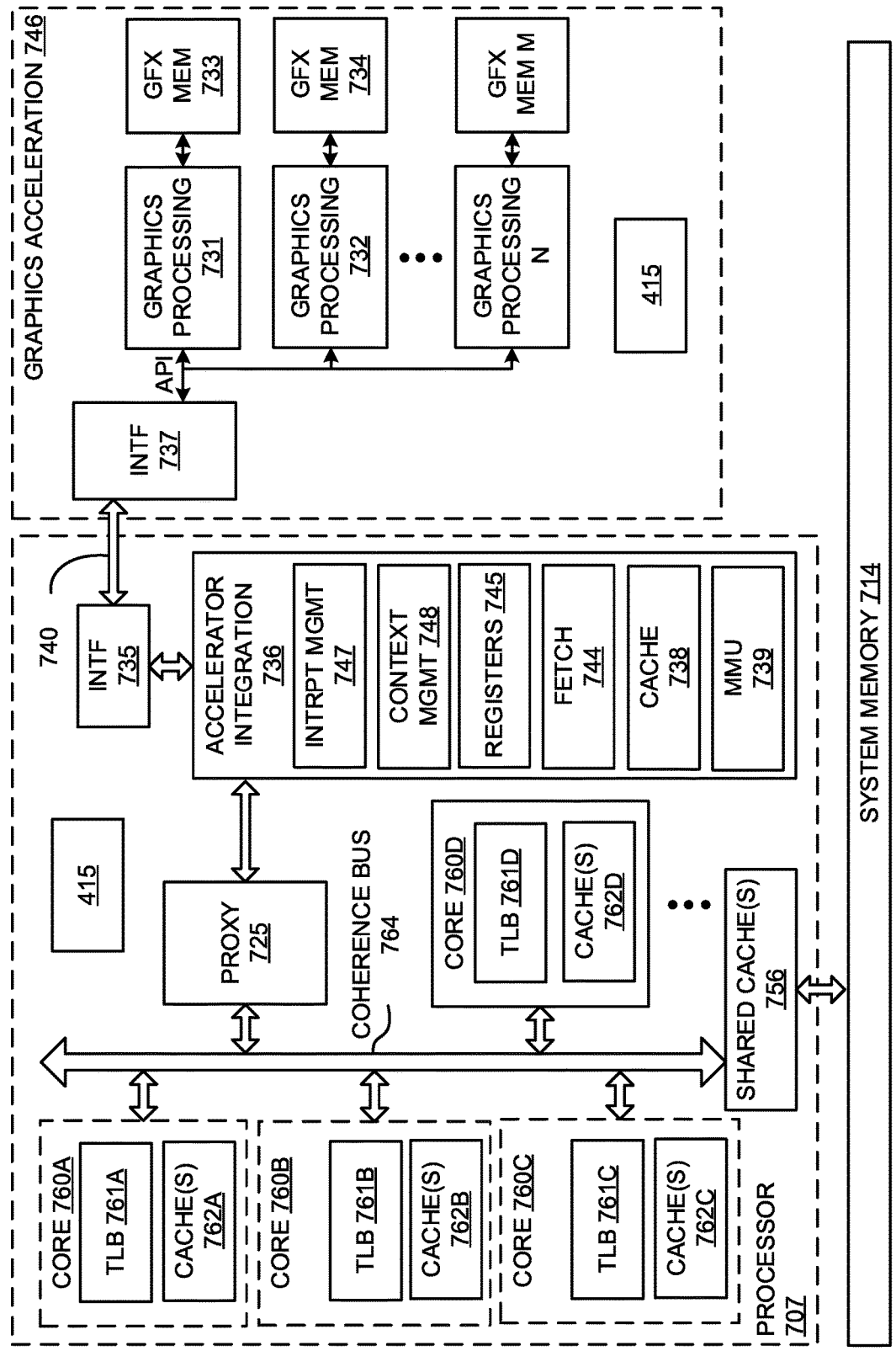
FIG. 7C illustrates a computer system, according to at least one embodiment.

FIG. 7C illustrates another exemplary embodiment in which accelerator integration circuit 736 is integrated within processor 707. In this embodiment, graphics processing engines 731-732, N communicate directly over high-speed link 740 to accelerator integration circuit 736 via interface 737 and interface 735 (which, again, may be utilize any form of bus or interface protocol). Accelerator integration circuit 736 may perform same operations as those described with respect to FIG. 7B, but potentially at a higher throughput given its close proximity to coherence bus 764 and caches 762A-762D, 756. One embodiment supports different programming models including a dedicated-process programming model (no graphics acceleration module virtualization) and shared programming models (with virtualization), which may include programming models which are controlled by accelerator integration circuit 736 and programming models which are controlled by graphics acceleration module 746.

In at least one embodiment, graphics processing engines 731-732, N are dedicated to a single application or process under a single operating system. In at least one embodiment, a single application can funnel other application requests to graphics processing engines 731-732, N, providing virtualization within a VM/partition.

In at least one embodiment, graphics processing engines 731-732, N, may be shared by multiple VM/application partitions. In at least one embodiment, shared models may use a system hypervisor to virtualize graphics processing engines 731-732, N to allow access by each operating system. For single-partition systems without a hypervisor, graphics processing engines 731-732, N are owned by an operating system. In at least one embodiment, an operating system can virtualize graphics processing engines 731-732, N to provide access to each process or application.

In at least one embodiment, graphics acceleration module 746 or an individual graphics processing engine 731-732, N selects a process element using a process handle. In one embodiment, process elements are stored in system memory 714 and are addressable using an effective address to real address translation techniques described herein. In at least one embodiment, a process handle may be an implementation-specific value provided to a host process when registering its context with graphics processing engine 731-732, N (that is, calling system software to add a process element to a process element linked list). In at least one embodiment, a lower 16-bits of a process handle may be an offset of a process element within a process element linked list.

Figure 7D:
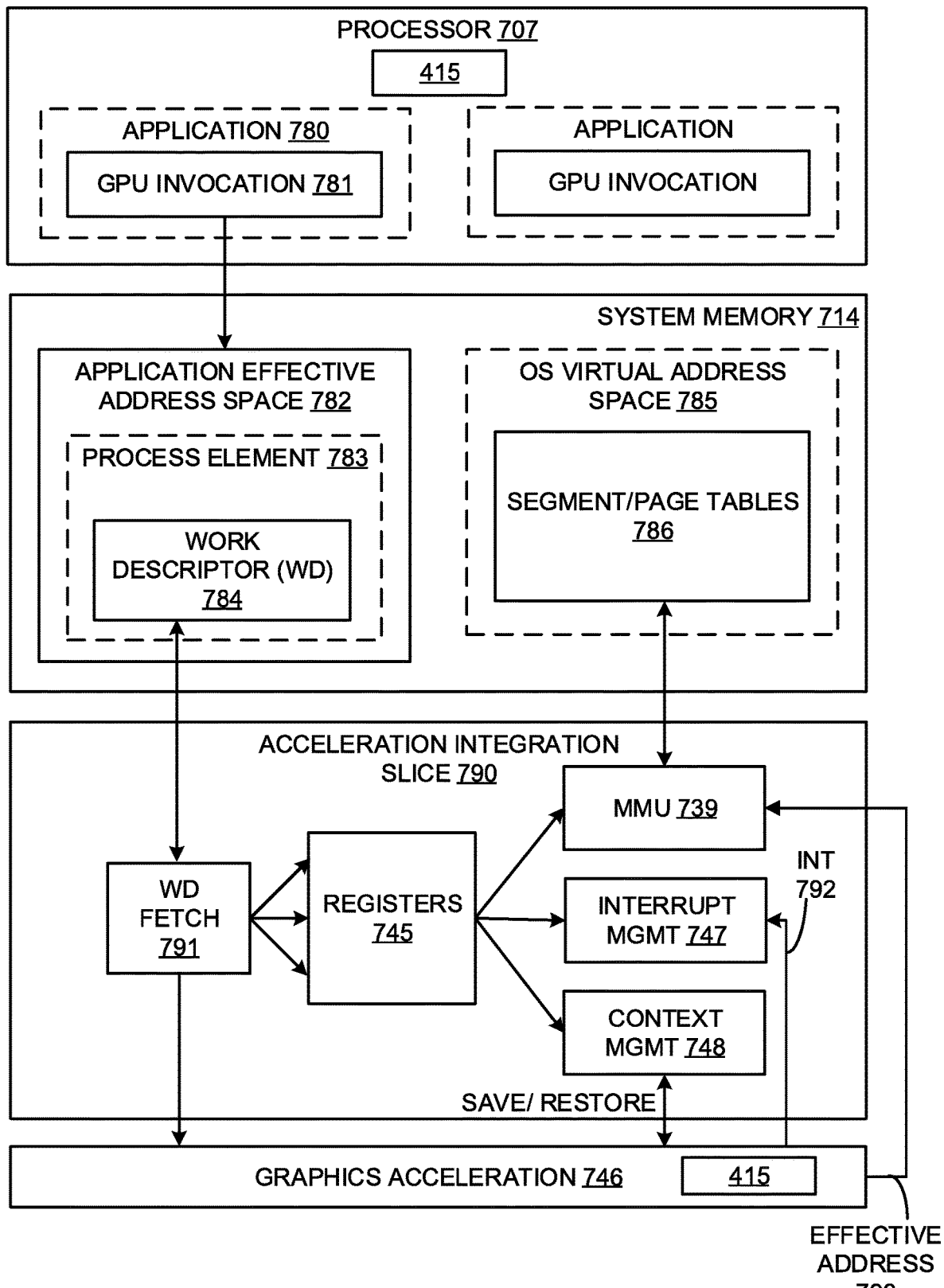
FIG. 7D illustrates a computer system, according to at least one embodiment.

FIG. 7D illustrates an exemplary accelerator integration slice 790. As used herein, a "slice" comprises a specified portion of processing resources of accelerator integration circuit 736. Application effective address space 782 within system memory 714 stores process elements 783. In one embodiment, process elements 783 are stored in response to GPU invocations 781 from applications 780 executed on processor 707. A process element 783 contains process state for corresponding application 780. A work descriptor (WD) 784 contained in process element 783 can be a single job requested by an application or may contain a pointer to a queue of jobs. In at least one embodiment, WD 784 is a pointer to a job request queue in an application's address space 782.

Graphics acceleration module 746 and/or individual graphics processing engines 731-732, N can be shared by all or a subset of processes in a system. In at least one embodiment, an infrastructure for setting up process state and sending a WD 784 to a graphics acceleration module 746 to start a job in a virtualized environment may be included.

In at least one embodiment, a dedicated-process programming model is implementation-specific. In this model, a single process owns graphics acceleration module 746 or an individual graphics processing engine 731. Because graphics acceleration module 746 is owned by a single process, a hypervisor initializes accelerator integration circuit 736 for an owning partition and an operating system initializes accelerator integration circuit 736 for an owning process when graphics acceleration module 746 is assigned.

In operation, a WD fetch unit 791 in accelerator integration slice 790 fetches next WD 784 which includes an indication of work to be done by one or more graphics processing engines of graphics acceleration module 746. Data from WD 784 may be stored in registers 745 and used by MMU 739, interrupt management circuit 747 and/or context management circuit 748 as illustrated. For example, one embodiment of MMU 739 includes segment/page walk circuitry for accessing segment/page tables 786 within OS virtual address space 785. Interrupt management circuit 747 may process interrupt events 792 received from graphics acceleration module 746. When performing graphics operations, an effective address 793 generated by a graphics processing engine 731-732, N is translated to a real address by MMU 739.

In one embodiment, a same set of registers 745 are duplicated for each graphics processing engine 731-732, N and/or graphics acceleration module 746 and may be initialized by a hypervisor or operating system. Each of these duplicated registers may be included in an accelerator integration slice 790. Exemplary registers that may be initialized by a hypervisor are shown in Table 1.

TABLE 1

| Hypervisor Initialized Registers |
| --- |
| 1 Slice Control Register |
| 2 Real Address (RA) Scheduled Processes Area Pointer |
| 3 Authority Mask Override Register |
| 4 Interrupt Vector Table Entry Offset |
| 5 Interrupt Vector Table Entry Limit |
| 6 State Register |
| 7 Logical Partition ID |
| 8 Real address (RA) Hypervisor Accelerator Utilization Record Pointer |
| 9 Storage Description Register |

Exemplary registers that may be initialized by an operating system are shown in Table 2.

TABLE 2

| Operating System Initialized Registers |
| --- |
| 1 Process and Thread Identification |
| 2 Effective Address (EA) Context Save/Restore Pointer |
| 3 Virtual Address (VA) Accelerator Utilization Record Pointer |

TABLE 2-continued

Operating System Initialized Registers

| | |
|---|---|
| 4 | Virtual Address (VA) Storage Segment Table Pointer |
| 5 | Authority Mask |
| 6 | Work descriptor |

In one embodiment, each WD 784 is specific to a particular graphics acceleration module 746 and/or graphics processing engines 731-732, N. It contains all information required by a graphics processing engine 731-732, N to do work or it can be a pointer to a memory location where an application has set up a command queue of work to be completed.

Figure 7E:
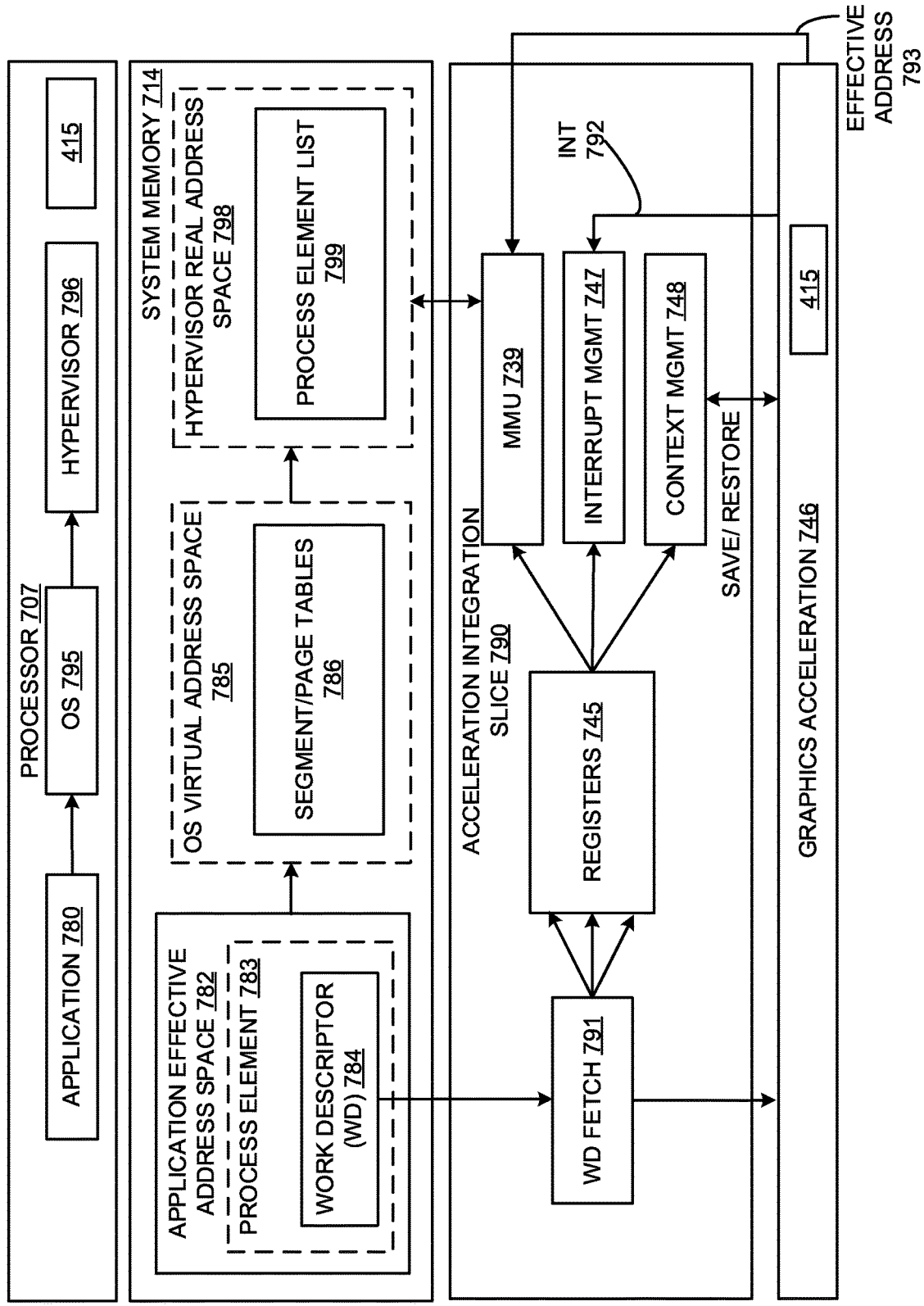
FIG. 7E illustrates a computer system, according to at least one embodiment.

FIG. 7E illustrates additional details for one exemplary embodiment of a shared model. This embodiment includes a hypervisor real address space 798 in which a process element list 799 is stored. Hypervisor real address space 798 is accessible via a hypervisor 796 which virtualizes graphics acceleration module engines for operating system 795.

In at least one embodiment, shared programming models allow for all or a subset of processes from all or a subset of partitions in a system to use a graphics acceleration module 746. There are two programming models where graphics acceleration module 746 is shared by multiple processes and partitions: time-sliced shared and graphics directed shared.

In this model, system hypervisor 796 owns graphics acceleration module 746 and makes its function available to all operating systems 795. For a graphics acceleration module 746 to support virtualization by system hypervisor 796, graphics acceleration module 746 may adhere to these following: 1) An application's job request must be autonomous (that is, state does not need to be maintained between jobs), or graphics acceleration module 746 must provide a context save and restore mechanism. 2) An application's job request is guaranteed by graphics acceleration module 746 to complete in a specified amount of time, including any translation faults, or graphics acceleration module 746 provides an ability to preempt processing of a job. 3) Graphics acceleration module 746 must be guaranteed fairness between processes when operating in a directed shared programming model.

In at least one embodiment, application 780 is required to make an operating system 795 system call with a graphics acceleration module 746 type, a work descriptor (WD), an authority mask register (AMR) value, and a context save/restore area pointer (CSRP). In at least one embodiment, graphics acceleration module 746 type describes a targeted acceleration function for a system call. In at least one embodiment, graphics acceleration module 746 type may be a system-specific value. In at least one embodiment, WD is formatted specifically for graphics acceleration module 746 and can be in a form of a graphics acceleration module 746 command, an effective address pointer to a user-defined structure, an effective address pointer to a queue of commands, or any other data structure to describe work to be done by graphics acceleration module 746. In one embodiment, an AMR value is an AMR state to use for a current process. In at least one embodiment, a value passed to an operating system is similar to an application setting an AMR. If accelerator integration circuit 736 and graphics acceleration module 746 implementations do not support a User Authority Mask Override Register (UAMOR), an operating system may apply a current UAMOR value to an AMR value before passing an AMR in a hypervisor call. Hypervisor 796 may optionally apply a current Authority Mask Override Register (AMOR) value before placing an AMR into process element 783. In at least one embodiment, CSRP is one of registers 745 containing an effective address of an area in an application's address space 782 for graphics acceleration module 746 to save and restore context state. This pointer is optional if no state is required to be saved between jobs or when a job is preempted. In at least one embodiment, context save/restore area may be pinned system memory.

Upon receiving a system call, operating system 795 may verify that application 780 has registered and been given authority to use graphics acceleration module 746. Operating system 795 then calls hypervisor 796 with information shown in Table 3.

TABLE 3

OS to Hypervisor Call Parameters

| | |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 796 verifies that operating system 795 has registered and been given authority to use graphics acceleration module 746. Hypervisor 796 then puts process element 783 into a process element linked list for a corresponding graphics acceleration module 746 type. A process element may include information shown in Table 4.

TABLE 4

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 7 | Storage Descriptor Register (SDR) |

In at least one embodiment, hypervisor initializes a plurality of accelerator integration slice 790 registers 745.

Figure 7F:
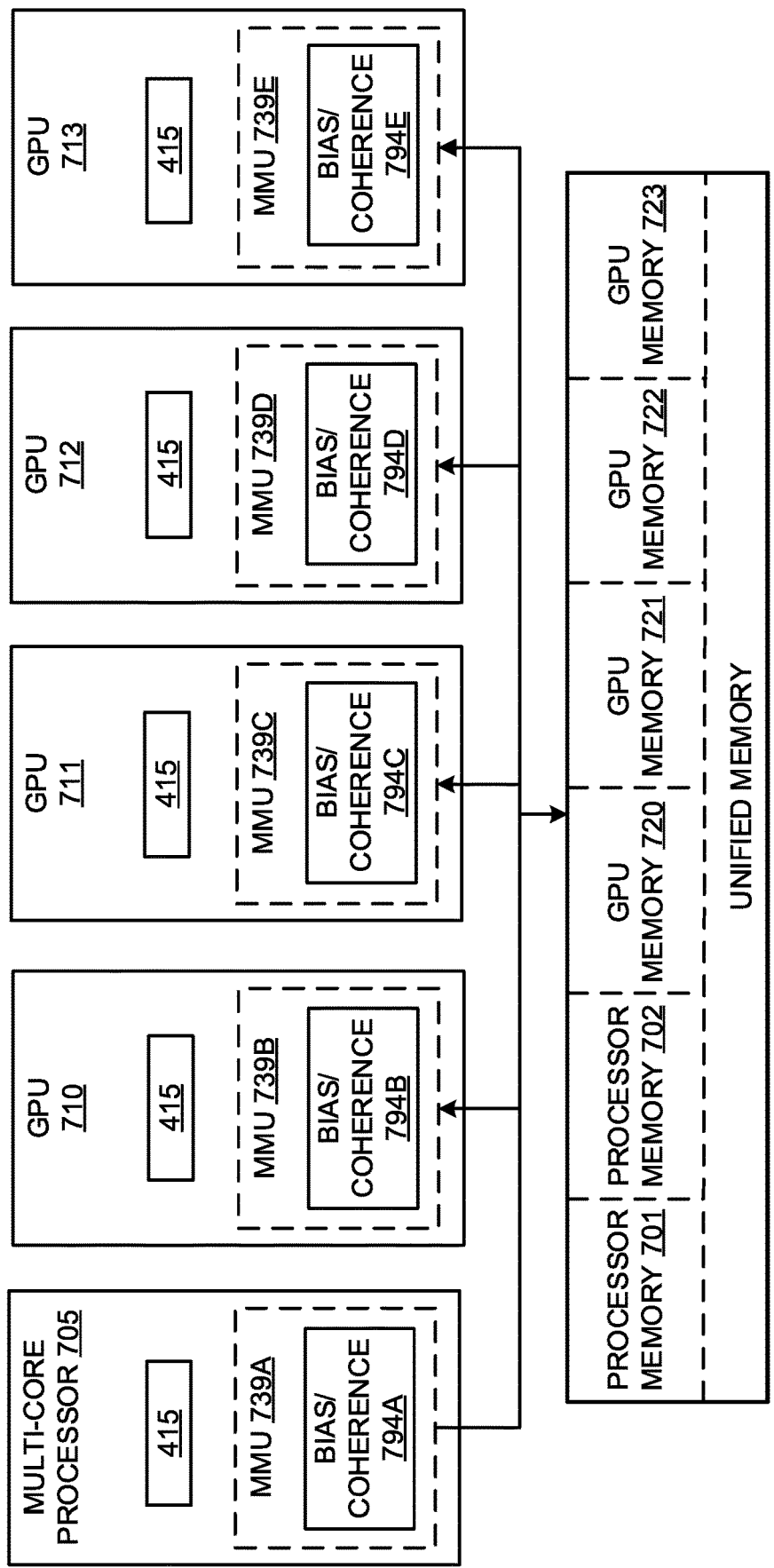
FIG. 7F illustrates a computer system, according to at least one embodiment.

As illustrated in FIG. 7F, in at least one embodiment, a unified memory is used, addressable via a common virtual memory address space used to access physical processor memories 701-702 and GPU memories 720-723. In this implementation, operations executed on GPUs 710-713 utilize a same virtual/effective memory address space to access processor memories 701-702 and vice versa, thereby simplifying programmability. In one embodiment, a first portion of a virtual/effective address space is allocated to processor memory 701, a second portion to second processor memory 702, a third portion to GPU memory 720, and so on. In at least one embodiment, an entire virtual/effective memory space (sometimes referred to as an effective address space) is thereby distributed across each of processor memories 701-702 and GPU memories 720-723, allowing any processor or GPU to access any physical memory with a virtual address mapped to that memory.

In one embodiment, bias/coherence management circuitry 794A-794E within one or more of MMUs 739A-739E ensures cache coherence between caches of one or more host processors (e.g., 705) and GPUs 710-713 and implements biasing techniques indicating physical memories in which certain types of data should be stored. While multiple instances of bias/coherence management circuitry 794A-794E are illustrated in FIG. 7F, bias/coherence circuitry may be implemented within an MMU of one or more host processors 705 and/or within accelerator integration circuit 736.

One embodiment allows GPU-attached memory 720-723 to be mapped as part of system memory, and accessed using shared virtual memory (SVM) technology, but without suffering performance drawbacks associated with full system cache coherence. In at least one embodiment, an ability for GPU-attached memory 720-723 to be accessed as system memory without onerous cache coherence overhead provides a beneficial operating environment for GPU offload. This arrangement allows host processor 705 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 720-723 without cache coherence overheads can be critical to execution time of an offloaded computation. In cases with substantial streaming write memory traffic, for example, cache coherence overhead can significantly reduce an effective write bandwidth seen by a GPU 710-713. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 720-723, with or without a bias cache in GPU 710-713 (e.g., to cache frequently/recently used entries of a bias table). Alternatively, an entire bias table may be maintained within a GPU.

In at least one embodiment, a bias table entry associated with each access to GPU-attached memory 720-723 is accessed prior to actual access to a GPU memory, causing following operations. First, local requests from GPU 710-713 that find their page in GPU bias are forwarded directly to a corresponding GPU memory 720-723. Local requests from a GPU that find their page in host bias are forwarded to processor 705 (e.g., over a high-speed link as discussed above). In one embodiment, requests from processor 705 that find a requested page in host processor bias complete a request like a normal memory read. Alternatively, requests directed to a GPU-biased page may be forwarded to GPU 710-713. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 705 bias to GPU bias, but is not for an opposite transition.

In one embodiment, cache coherency is maintained by temporarily rendering GPU-biased pages uncacheable by host processor 705. To access these pages, processor 705 may request access from GPU 710 which may or may not grant access right away. Thus, to reduce communication between processor 705 and GPU 710 it is beneficial to ensure that GPU-biased pages are those which are required by a GPU but not host processor 705 and vice versa.

Hardware structure(s) 515 are used to perform one or more embodiments. Details regarding hardware structure(x) 515 are provided below in conjunction with FIGS. 5 and 7.

Figure 8A:
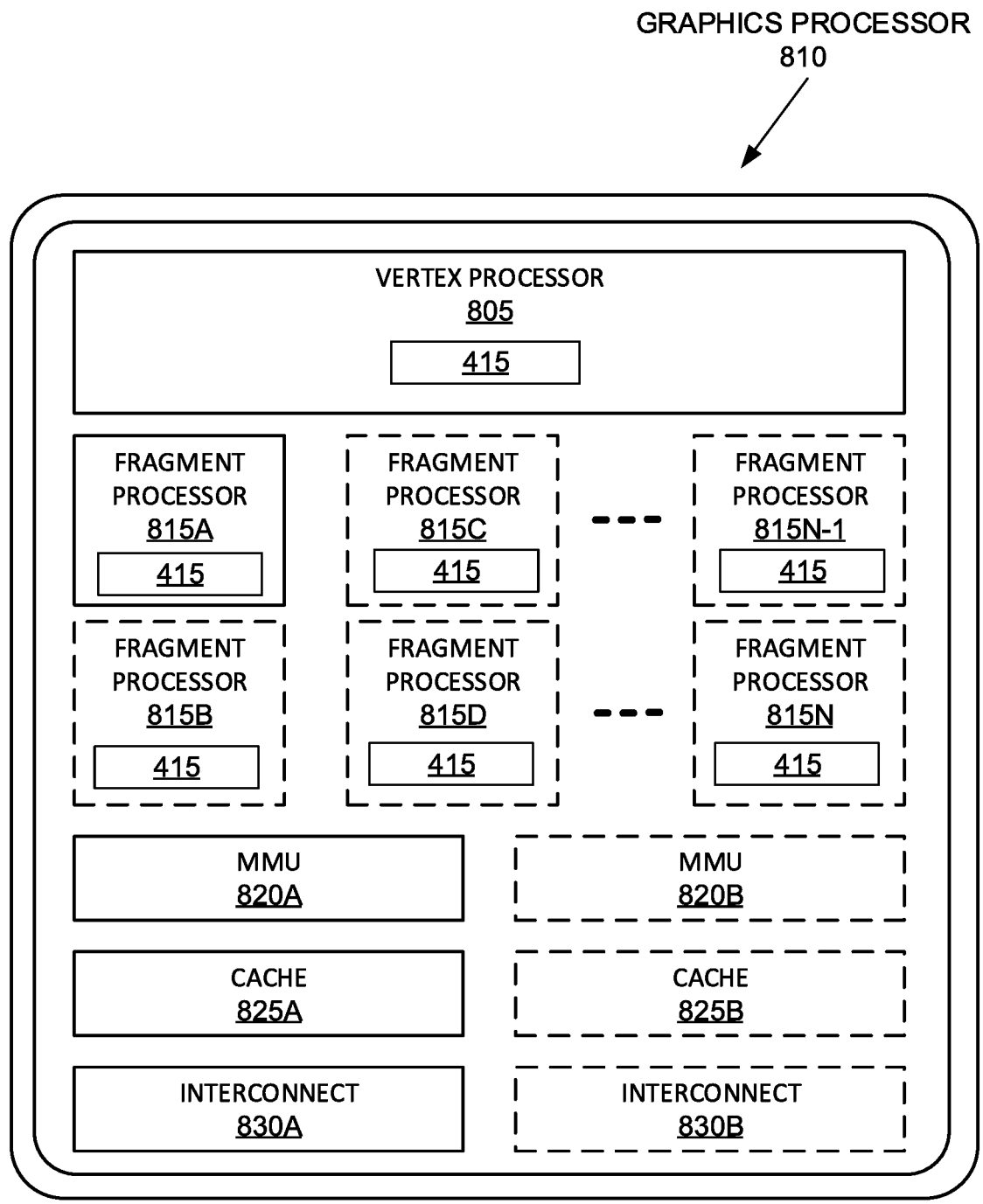
FIGS. 8A-8B illustrate exemplary integrated circuits and associated graphics processors, according to at least one embodiment.
Figure 8B:
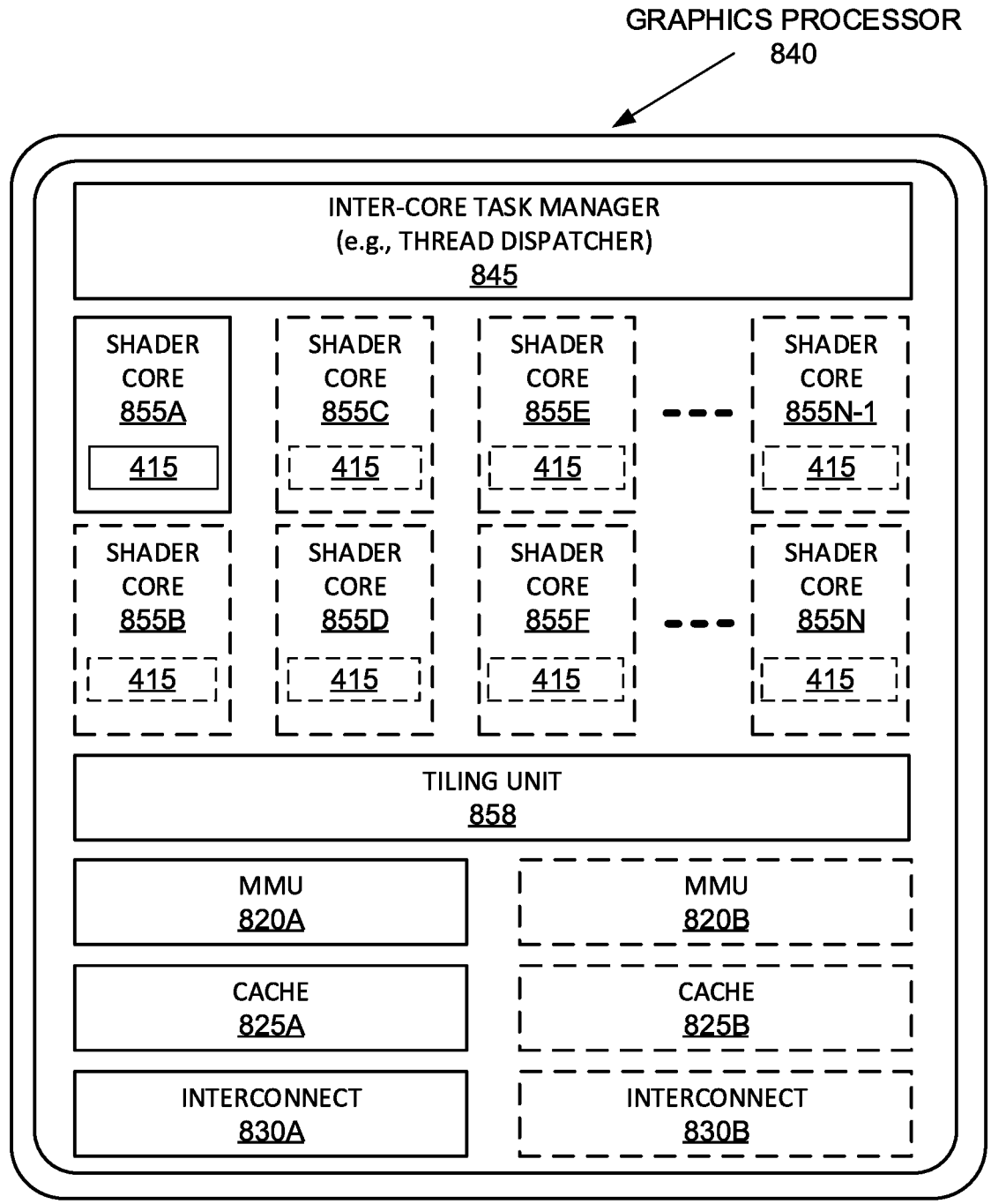

FIGS. 8A-8B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 8A-8B are block diagrams illustrating exemplary graphics processors for use within an SoC, according to embodiments described herein. FIG. 8A illustrates an exemplary graphics processor 810 of a system on a chip integrated circuit that may be fabricated using one or more IP cores, according to at least one embodiment. FIG. 8B illustrates an additional exemplary graphics processor 840 of a system on a chip integrated circuit that may be fabricated using one or more IP cores, according to at least one embodiment. In at least one embodiment, graphics processor 810 of FIG. 8A is a low power graphics processor core. In at least one embodiment, graphics processor 840 of FIG. 8B is a higher performance graphics processor core.

In at least one embodiment, graphics processor 810 includes a vertex processor 805 and one or more fragment processor(s) 815A-815N (e.g., 815A, 815B, 815C, 815D, through 815N-1, and 815N). In at least one embodiment, graphics processor 810 can execute different shader programs via separate logic, such that vertex processor 805 is optimized to execute operations for vertex shader programs, while one or more fragment processor(s) 815A-815N execute fragment (e.g., pixel) shading operations for fragment or pixel shader programs. In at least one embodiment, vertex processor 805 performs a vertex processing stage of a 3D graphics pipeline and generates primitives and vertex data. In at least one embodiment, fragment processor(s) 815A-815N use primitive and vertex data generated by vertex processor 805 to produce a framebuffer that is displayed on a display device. In at least one embodiment, fragment processor(s) 815A-815N are optimized to execute fragment shader programs as provided for in an OpenGL API, which may be used to perform similar operations as a pixel shader program as provided for in a Direct 3D API.

In at least one embodiment, graphics processor 810 additionally includes one or more memory management units (MMUs) 820A-820B, cache(s) 825A-825B, and circuit interconnect(s) 830A-830B. In at least one embodiment, one or more MMU(s) 820A-820B provide for virtual to physical address mapping for graphics processor 810, including for vertex processor 805 and/or fragment processor(s) 815A-815N, which may reference vertex or image/texture data stored in memory, in addition to vertex or image/texture data stored in one or more cache(s) 825A-825B. In at least one embodiment, one or more MMU(s) 820A-820B may be synchronized with other MMUs within system, including one or more MMUs associated with one or more application processor(s) can participate in a shared or unified virtual memory system. In at least one embodiment, one or more circuit interconnect(s) 830A-830B enable graphics processor 810 to interface with other IP cores within SoC, either via an internal bus of SoC or via a direct connection.

In at least one embodiment, graphics processor 840 includes one or more MMU(s) 820A-820B, caches 825A-825B, and circuit interconnects 830A-830B of graphics processor 810 of FIG. 8A. In at least one embodiment, graphics processor 840 includes one or more shader core(s) 855A-855N (e.g., 855A, 855B, 855C, 855D, 855E, 855F, through 855N-1, and 855N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 840 includes an inter-core task manager 845, which acts as a thread dispatcher to dispatch execution threads to one or more shader cores 855A-855N and a tiling unit 858 to accelerate tiling operations for tile-based rendering, in which rendering operations for a scene are subdivided in image space, for example to exploit local spatial coherence within a scene or to optimize use of internal caches.

Data analytics logic 415 are used to perform data analytics operations associated with one or more embodiments. Details regarding data analytics logic 415 are provided below in conjunction with FIGS. 8A and/or 8B. In at least one embodiment, data analytics logic 415 may be used in integrated circuit 8A and/or 8B for data analytics operations related to data transformation, data loading, machine learning, heuristic algorithms probabilistic algorithms, linear models, support vectors, regressions, clustering, dimensionality reduction, classification and/or deep learning algorithms based, at least in part, on weight parameters calculated using neural network training operations, neural network functions and/or architectures, or neural network use cases described herein.

In at least one embodiment, data analytics logic 415 may execute processes and calculations to implement system 100. In at least one embodiment, the data analytics logic 415 may retrieve instructions for implementing networks of system 100, and other data stored only in the GPU memory for using system 100 to perform data analytics operations as above.

Figure 9A:
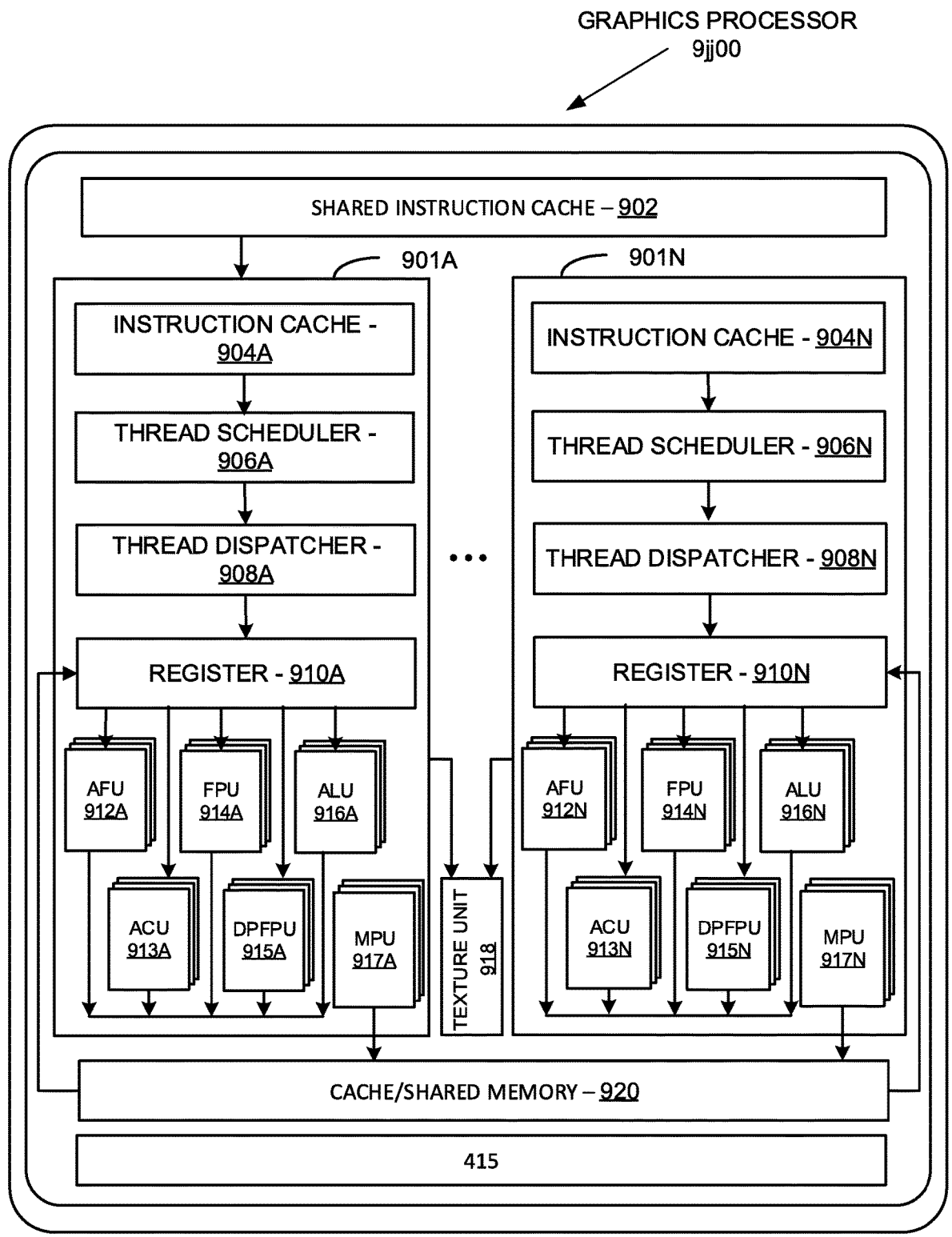
FIGS. 9A-9B illustrate additional exemplary graphics processor logic according to at least one embodiment.
Figure 9B:
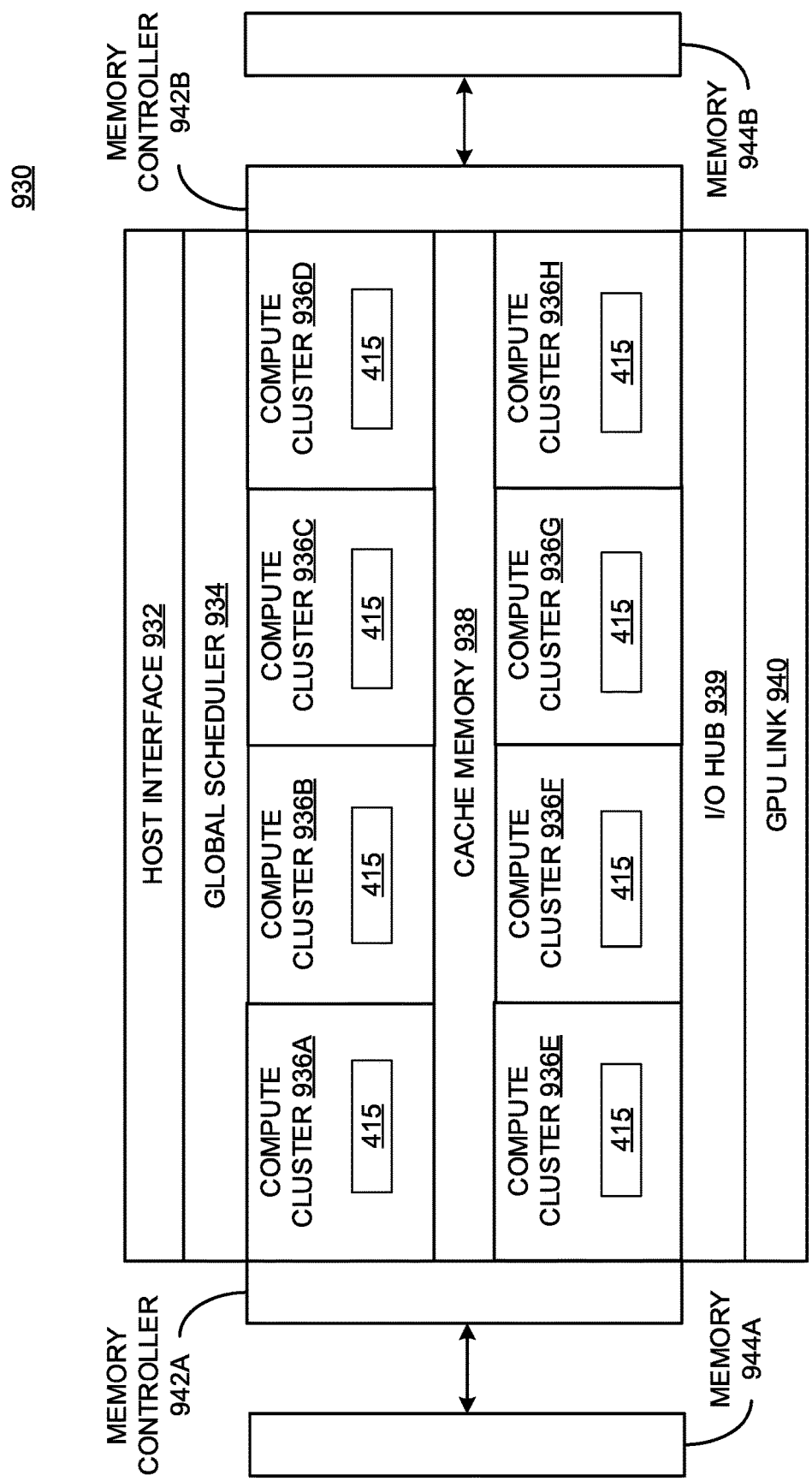

FIGS. 9A-9B illustrate additional exemplary graphics processor logic according to embodiments described herein. FIG. 9A illustrates a graphics core 900 that may be included within graphics processor, in at least one embodiment, and may be a unified shader core 1455A-1455N as in FIG. 14B in at least one embodiment. FIG. 9B illustrates a highly-parallel general-purpose graphics processing unit 930 suitable for deployment on a multi-chip module in at least one embodiment.

In at least one embodiment, graphics core 900 includes a shared instruction cache 902, a texture unit 918, and a cache/shared memory 920 that are common to execution resources within graphics core 900. In at least one embodiment, graphics core 900 can include multiple slices 901A-901N or partition for each core, and a graphics processor can include multiple instances of graphics core 900. Slices 901A-901N can include support logic including a local instruction cache 904A-904N, a thread scheduler 906A-906N, a thread dispatcher 908A-908N, and a set of registers 910A-910N. In at least one embodiment, slices 901A-901N can include a set of additional function units (AFUs 97A-97N), floating-point units (FPU 914A-914N), integer arithmetic logic units (ALUs 916-916N), address computational units (ACU 913A-913N), double-precision floating-point units (DPFPU 99A-99N), and matrix processing units (MPU 917A-917N).

In at least one embodiment, FPUs 914A-914N can perform single-precision (32-bit) and half-precision (16-bit) floating point operations, while DPFPUs 99A-99N perform double precision (64-bit) floating point operations. In at least one embodiment, ALUs 916A-916N can perform variable precision integer operations at 8-bit, 16-bit, and 32-bit precision, and can be configured for mixed precision operations. In at least one embodiment, MPUs 917A-917N can also be configured for mixed precision matrix operations, including half-precision floating point and 8-bit integer operations. In at least one embodiment, MPUs 917-917N can perform a variety of matrix operations to accelerate machine learning application frameworks, including enabling support for accelerated general matrix to matrix multiplication (GEMM). In at least one embodiment, AFUs 97A-97N can perform additional logic operations not supported by floating-point or integer units, including trigonometric operations (e.g., Sine, Cosine, etc.).

Data analytics logic 415 are used to perform data analytics operations associated with one or more embodiments. Details regarding data analytics logic 415 are provided below in conjunction with FIGS. 9A and/or 9B. In at least one embodiment, data analytics logic 415 may be used in graphics core 900 for data analytics operations related to data transformation, data loading, machine learning, heuristic algorithms probabilistic algorithms, linear models, support vectors, regressions, clustering, dimensionality reduction, classification and/or deep learning algorithms based, at least in part, on weight parameters calculated using neural network training operations, neural network functions and/or architectures, or neural network use cases described herein.

In at least one embodiment, data analytics logic 415 may execute processes and calculations to implement system 100. In at least one embodiment, data analytics logic 415 may retrieve instructions for implementing networks of system 100, as well as other data stored only in the memory of GPU for using system 100 to perform data analytics operations as above.

FIG. 9B illustrates a general-purpose processing unit (GPGPU) 930 that can be configured to enable highly-parallel compute operations to be performed by an array of graphics processing units, in at least one embodiment. In at least one embodiment, GPGPU 930 can be linked directly to other instances of GPGPU 930 to create a multi-GPU cluster to improve training speed for deep neural networks. In at least one embodiment, GPGPU 930 includes a host interface 932 to enable a connection with a host processor. In at least one embodiment, host interface 932 is a PCI Express interface. In at least one embodiment, host interface 932 can be a vendor specific communications interface or communications fabric. In at least one embodiment, GPGPU 930 receives commands from a host processor and uses a global scheduler 934 to distribute execution threads associated with those commands to a set of compute clusters 936A-936H. In at least one embodiment, compute clusters 936A-936H share a cache memory 938. In at least one embodiment, cache memory 938 can serve as a higher-level cache for cache memories within compute clusters 936A-936H.

In at least one embodiment, GPGPU 930 includes memory 944A-944B coupled with compute clusters 936A-936H via a set of memory controllers 942A-942B. In at least one embodiment, memory 944A-944B can include various types of memory devices including dynamic random access memory (DRAM) or graphics random access memory, such as synchronous graphics random access memory (SGRAM), including graphics double data rate (GDDR) memory.

In at least one embodiment, compute clusters 936A-936H each include a set of graphics cores, such as graphics core 900 of FIG. 9A, which can include multiple types of integer and floating point logic units that can perform computational operations at a range of precisions including suited for machine learning computations. For example, in at least one embodiment, at least a subset of floating point units in each of compute clusters 936A-936H can be configured to perform 16-bit or 32-bit floating point operations, while a different subset of floating point units can be configured to perform 64-bit floating point operations.

In at least one embodiment, multiple instances of GPGPU 930 can be configured to operate as a compute cluster. In at least one embodiment, communication used by compute clusters 936A-936H for synchronization and data exchange varies across embodiments. In at least one embodiment, multiple instances of GPGPU 930 communicate over host interface 932. In at least one embodiment, GPGPU 930 includes an I/O hub 939 that couples GPGPU 930 with a GPU link 940 that enables a direct connection to other instances of GPGPU 930. In at least one embodiment, GPU link 940 is coupled to a dedicated GPU-to-GPU bridge that enables communication and synchronization between multiple instances of GPGPU 930. In at least one embodiment GPU link 940 couples with a high speed interconnect to transmit and receive data to other GPGPUs or parallel processors. In at least one embodiment, multiple instances of GPGPU 930 are located in separate data processing systems and communicate via a network device that is accessible via host interface 932. In at least one embodiment GPU link 940 can be configured to enable a connection to a host processor in addition to or as an alternative to host interface 932.

In at least one embodiment, GPGPU 930 can be configured to train neural networks. In at least one embodiment, GPGPU 930 can be used within an inferencing platform. In at least one embodiment, in which GPGPU 930 is used for inferencing, GPGPU may include fewer compute clusters 936A-936H relative to when GPGPU is used for training a neural network. In at least one embodiment, memory technology associated with memory 944A-944B may differ between inferencing and training configurations, with higher bandwidth memory technologies devoted to training configurations. In at least one embodiment, inferencing configuration of GPGPU 930 can support inferencing specific instructions. For example, in at least one embodiment, an inferencing configuration can provide support for one or more 8-bit integer dot product instructions, which may be used during inferencing operations for deployed neural networks.

Data analytics logic 415 are used to perform data analytics operations associated with one or more embodiments. Details regarding data analytics logic 415 are provided in conjunction with FIGS. 9A and/or 9B. In at least one embodiment, data analytics logic 315 may be used in GPGPU 930 for data analytics operations related to data transformation, data loading, machine learning, heuristic algorithms probabilistic algorithms, linear models, support vectors, regressions, clustering, dimensionality reduction, classification and/or deep learning algorithms based, at least in part, on weight parameters calculated using neural network training operations, neural network functions and/or architectures, or neural network use cases described herein.

In at least one embodiment, data analytics logic 415 may execute processes and calculations to implement system 100. In at least one embodiment, data analytics logic 415 may retrieve instructions for implementing networks of system 100, as well as and other data stored only in the memory of the GPU unit for using system 100 to perform data analytic operations as above.

Figure 10:
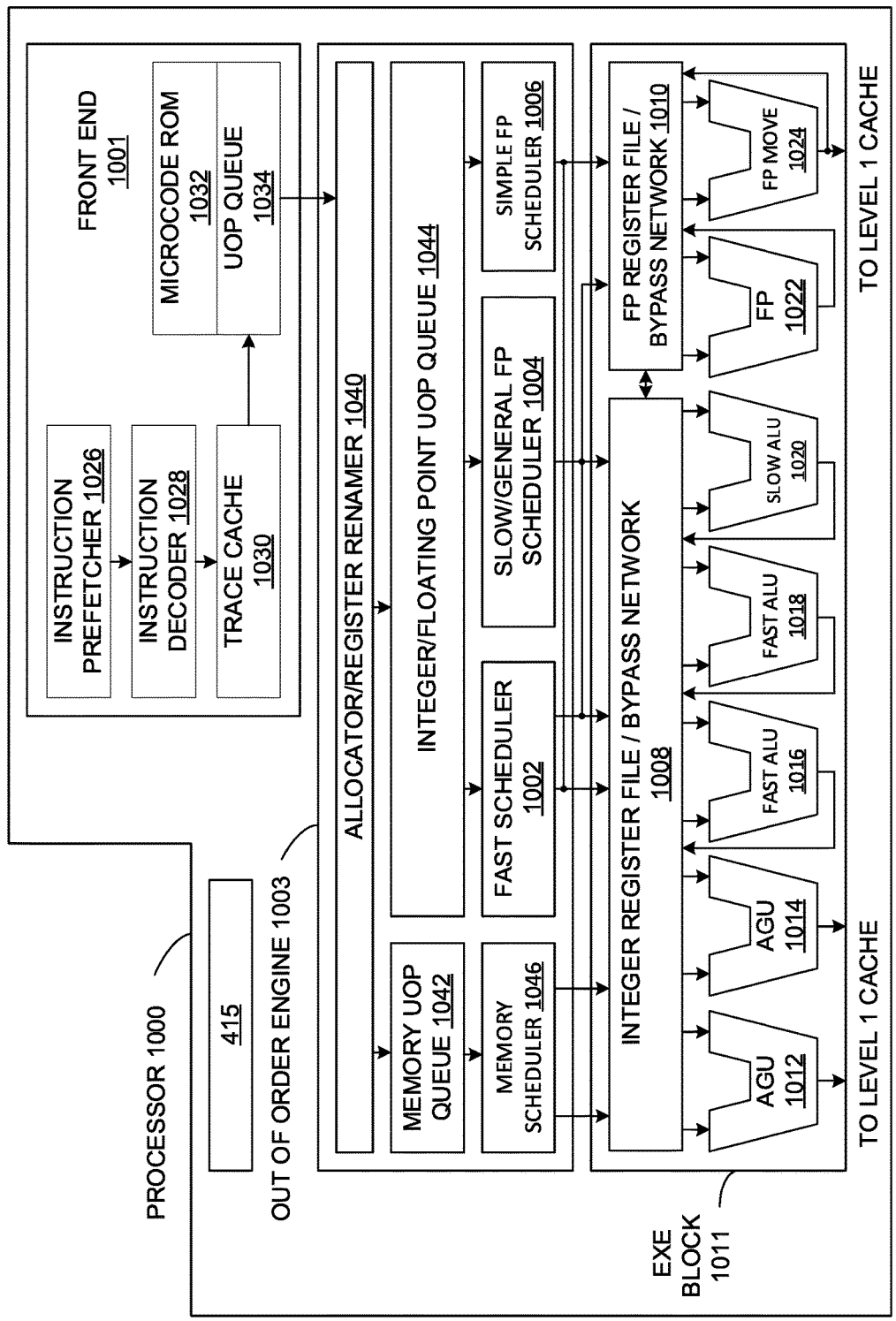
FIG. 10 is a block diagram illustrating a processor micro-architecture for a processor, according to at least one embodiment.

FIG. 10 is a block diagram illustrating micro-architecture for a processor 1000 that may include logic circuits to perform instructions, according to at least one embodiment. In at least one embodiment, processor 1000 may perform instructions, including x86 instructions, ARM instructions, specialized instructions for application-specific integrated circuits (ASICs), etc. In at least one embodiment, processor 1010 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 78-bit wide XMM registers relating to SSE2, SSE3, SSE4, AVX, or beyond (referred to generically as "SSEx") technology may hold such packed data operands. In at least one embodiment, processors 1010 may perform instructions to accelerate machine learning or deep learning algorithms, training, or inferencing.

In at least one embodiment, processor 1000 includes an in-order front end ("front end") 1001 to fetch instructions to be executed and prepare instructions to be used later in processor pipeline. In at least one embodiment, front end 1001 may include several units. In at least one embodiment, an instruction prefetcher 1026 fetches instructions from memory and feeds instructions to an instruction decoder 1028 which in turn decodes or interprets instructions. For example, in at least one embodiment, instruction decoder 1028 decodes a received instruction into one or more operations called "micro-instructions" or "micro-operations" (also called "micro ops" or "uops") that machine may execute. In at least one embodiment, instruction decoder 1028 parses instruction into an opcode and corresponding data and control fields that may be used by micro-architecture to perform operations in accordance with at least one embodiment. In at least one embodiment, a trace cache 1030 may assemble decoded uops into program ordered sequences or traces in a uop queue 1034 for execution. In at least one embodiment, when trace cache 1030 encounters a complex instruction, a microcode ROM 1032 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 1028 may access microcode ROM 1032 to perform instruction. In at least one embodiment, an instruction may be decoded into a small number of micro-ops for processing at instruction decoder 1028. In at least one embodiment, an instruction may be stored within microcode ROM 1032 should a number of micro-ops be needed to accomplish operation. In at least one embodiment, trace cache 1030 refers to an entry point programmable logic array ("PLA") to determine a correct micro-instruction pointer for reading microcode sequences to complete one or more instructions from microcode ROM 1032 in accordance with at least one embodiment. In at least one embodiment, after microcode ROM 1032 finishes sequencing micro-ops for an instruction, front end 1001 of machine may resume fetching micro-ops from trace cache 1030.

In at least one embodiment, out-of-order execution engine ("out of order engine") 1003 may prepare instructions for execution. In at least one embodiment, out-of-order execution logic has a number of buffers to smooth out and re-order flow of instructions to optimize performance as they go down pipeline and get scheduled for execution. out-of-order execution engine 1003 includes, without limitation, an allocator/register renamer 1040, a memory uop queue 1042, an integer/floating point uop queue 1044, a memory scheduler 1046, a fast scheduler 1002, a slow/general floating point scheduler ("slow/general FP scheduler") 1004, and a simple floating point scheduler ("simple FP scheduler") 1006. In at least one embodiment, fast schedule 1002, slow/general floating point scheduler 1004, and simple floating point scheduler 1006 are also collectively referred to herein as "uop schedulers 1002, 1004, 1006." allocator/register renamer 1040 allocates machine buffers and resources that each uop needs in order to execute. In at least one embodiment, allocator/register renamer 1040 renames logic registers onto entries in a register file. In at least one embodiment, allocator/register renamer 1040 also allocates an entry for each uop in one of two uop queues, memory uop queue 1042 for memory operations and integer/floating point uop queue 1044 for non-memory operations, in front of memory scheduler 1046 and uop schedulers 1002, 1004, 1006. In at least one embodiment, uop schedulers 1002, 1004, 1006, determine when a uop is ready to execute based on readiness of their dependent input register operand sources and availability of execution resources uops need to complete their operation. In at least one embodiment, fast scheduler 1002 of at least one embodiment may schedule on each half of main clock cycle while slow/general floating point scheduler 1004 and simple floating point scheduler 1006 may schedule once per main processor clock cycle. In at least one embodiment, uop schedulers 1002, 1004, 1006 arbitrate for dispatch ports to schedule uops for execution.

In at least one embodiment, execution block b11 includes, without limitation, an integer register file/bypass network 1008, a floating point register file/bypass network ("FP register file/bypass network") 1010, address generation units ("AGUs") 1007 and 1014, fast Arithmetic Logic Units (ALUs) ("fast ALUs") 1016 and 1018, a slow Arithmetic Logic Unit ("slow ALU") 1020, a floating point ALU ("FP") 1022, and a floating point move unit ("FP move") 1024. In at least one embodiment, integer register file/bypass network 1008 and floating point register file/bypass network 1010 are also referred to herein as "register files 1008, 1010." In at least one embodiment, AGUSs 1007 and 1014, fast ALUs 1016 and 1018, slow ALU 1020, floating point ALU 1022, and floating point move unit 1024 are also referred to herein as "execution units 107, 1014, 1016, 1018, 1010, 1022, and 1024." In at least one embodiment, execution block b11 may include, without limitation, any number (including zero) and type of register files, bypass networks, address generation units, and execution units, in any combination.

In at least one embodiment, register files 1008, 1010 may be arranged between uop schedulers 1002, 1004, 1006, and execution units 107, 1014, 1016, 1018, 1010, 1022, and 1024. In at least one embodiment, integer register file/bypass network 1008 performs integer operations. In at least one embodiment, floating point register file/bypass network 1010 performs floating point operations. In at least one embodiment, each of register files 1008, 1010 may include, without limitation, a bypass network that may bypass or forward just completed results that have not yet been written into register file to new dependent uops. In at least one embodiment, register files 1008, 1010 may communicate data with each other. In at least one embodiment, integer register file/bypass network 1008 may include, without limitation, two separate register files, one register file for low-order thirty-two bits of data and a second register file for high order thirty-two bits of data. In at least one embodiment, floating point register file/bypass network 1010 may include, without limitation, 78-bit wide entries because floating point instructions typically have operands from 64 to 78 bits in width.

In at least one embodiment, execution units 107, 1014, 1016, 1018, 1010, 1022, 1024 may execute instructions. In at least one embodiment, register files 1008, 1010 store integer and floating point data operand values that microinstructions need to execute. In at least one embodiment, processor 1000 may include, without limitation, any number and combination of execution units 107, 1014, 1016, 1018, 1010, 1022, 1024. In at least one embodiment, floating point ALU 1022 and floating point move unit 1024, may execute floating point, MMX, SIMD, AVX and SSE, or other operations, including specialized machine learning instructions. In at least one embodiment, floating point ALU 1022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 1016, 1018. In at least one embodiment, fast ALUS 1016, 1018 may execute fast operations with an effective latency of half a clock cycle. In at least one embodiment, most complex integer operations go to slow ALU 1020 as slow ALU 1020 may include, without limitation, integer execution hardware for long-latency type of operations, such as a multiplier, shifts, flag logic, and branch processing. In at least one embodiment, memory load/store operations may be executed by AGUS 107, 1014. In at least one embodiment, fast ALU 1016, fast ALU 1018, and slow ALU 1020 may perform integer operations on 64-bit data operands. In at least one embodiment, fast ALU 1016, fast ALU 1018, and slow ALU 1020 may be implemented to support a variety of data bit sizes including sixteen, thirty-two, 78, 256, etc. In at least one embodiment, floating point ALU 1022 and floating point move unit 1024 may be implemented to support a range of operands having bits of various widths. In at least one embodiment, floating point ALU 1022 and floating point move unit 1024 may operate on 78-bit wide packed data operands in conjunction with SIMD and multimedia instructions.

In at least one embodiment, uop schedulers 1002, 1004, 1006, dispatch dependent operations before parent load has finished executing. In at least one embodiment, as uops may be speculatively scheduled and executed in processor 1000, processor 1000 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Data analytics logic 415 are used to perform data analytics operations associated with one or more embodiments. Details regarding data analytics logic 415 are provided with FIG. 10. In at least one embodiment portions or all of data analytics logic 415 may be incorporated into EXE Block 1011 and other memory or registers shown or not shown. For example, in at least one embodiment, training and/or inferencing techniques described herein may use one or more of ALUs illustrated in EXE Block 1011. Moreover, weight parameters may be stored in on-chip or off-chip memory and/or registers (shown or not shown) that configure ALUs of EXE Block 1011 to perform one or more data analytic operations related to data transformation, data loading, machine learning, heuristic algorithms probabilistic algorithms, linear models, support vectors, regressions, clustering, dimensionality reduction, classification and/or deep learning algorithms based, at least in part, on neural network architectures, use cases, or training techniques described herein.

In at least one embodiment, data analytics logic 415 of EXE block 1011 may execute processes and calculations to implement system 100. In at least one embodiment, data analytics logic 415 may retrieve instructions for implementing networks of system 100, as well as other data stored only in the memory of the GPU unit for using the system 100 to perform data analytic operations as above.

Figure 11:
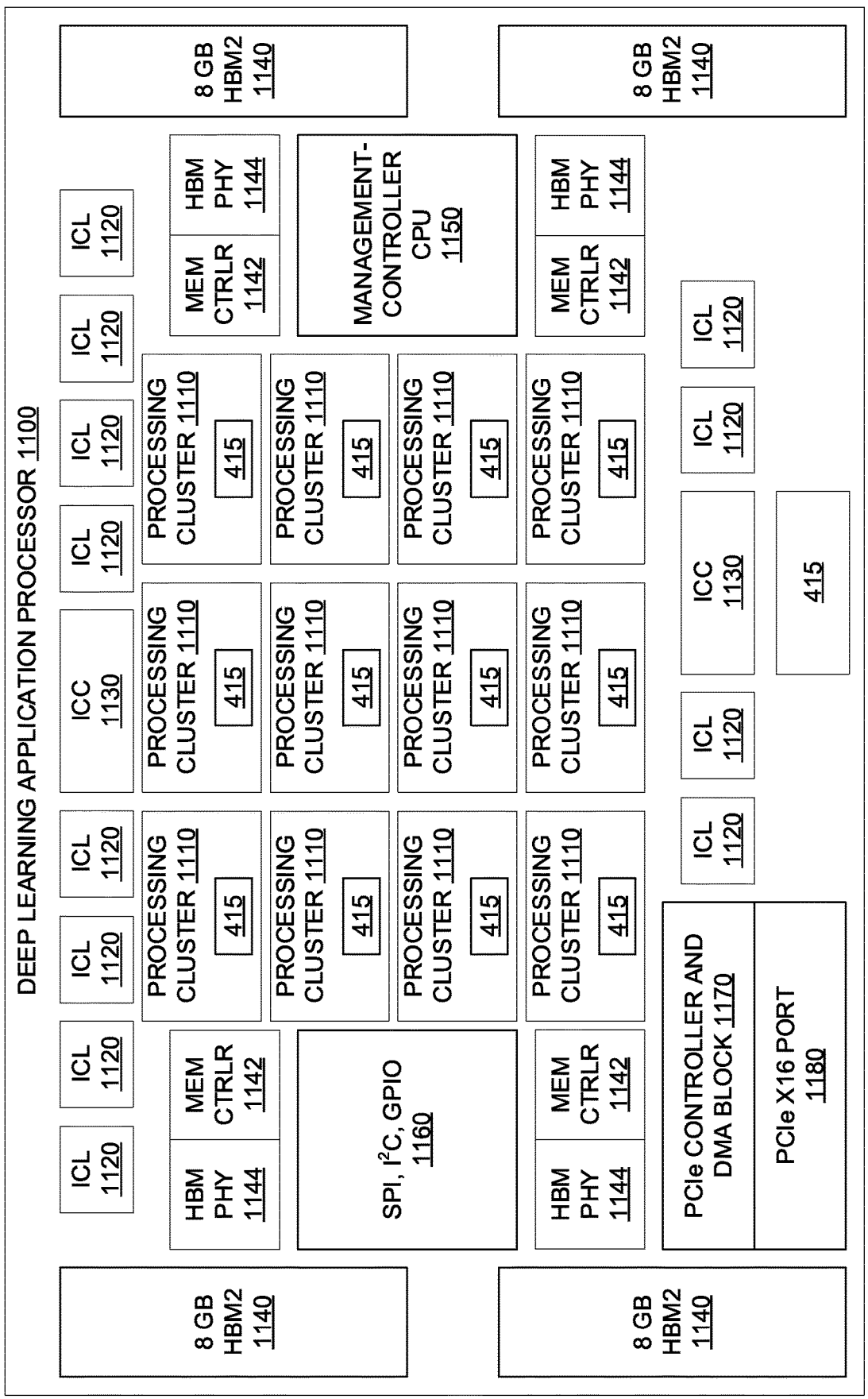
FIG. 11 illustrates a deep learning application processor, according to at least one embodiment.

FIG. 11 illustrates a deep learning application processor 1100, according to at least one embodiment. In at least one embodiment, deep learning application processor 1100 uses instructions that, if executed by deep learning application processor 1100, cause deep learning application processor 1100 to perform some or all of processes and techniques described throughout this disclosure. In at least one embodiment, deep learning application processor 1100 is an application-specific integrated circuit (ASIC). In at least one embodiment, application processor 1100 performs matrix multiply operations either "hard-wired" into hardware as a result of performing one or more instructions or both. In at least one embodiment, deep learning application processor 1100 includes, without limitation, processing clusters 1110(1)-1110(7), Inter-Chip Links ("ICLs") 270(1)-270(7), Inter-Chip Controllers ("ICCs") 1130(1)-1130(2), high bandwidth memory second generation ("HBM2") 1140(1)-1140(4), memory controllers ("Mem Ctrlrs") 1142(1)-1142(4), high bandwidth memory physical layer ("HBM PHY") 1144(1)-1144(4), a management-controller central processing unit ("management-controller CPU") 1150, a Serial Peripheral Interface, Inter-Integrated Circuit, and General Purpose Input/Output block ("SPI, I2C, GPIO") 1160, a peripheral component interconnect express controller and direct memory access block ("PCIe Controller and DMA") 1170, and a sixteen-lane peripheral component interconnect express port ("PCI Express×16") 1180.

In at least one embodiment, processing clusters 1110 may perform deep learning operations, including inference or prediction operations based on weight parameters calculated one or more training techniques, including those described herein. In at least one embodiment, each processing cluster 1110 may include, without limitation, any number and type of processors. In at least one embodiment, deep learning application processor 1100 may include any number and type of processing clusters 1100. In at least one embodiment, Inter-Chip Links 270 are bi-directional. In at least one embodiment, Inter-Chip Links 270 and Inter-Chip Controllers 1130 enable multiple deep learning application processors 1100 to exchange information, including activation information resulting from performing one or more machine learning algorithms embodied in one or more neural networks. In at least one embodiment, deep learning application processor 1100 may include any number (including zero) and type of ICLs 270 and ICCs 1130.

In at least one embodiment, HBM2s 1140 provide a total of 32 Gigabytes (GB) of memory. HBM2 1140(i) is associated with both memory controller 1142(i) and HBM PHY 1144(i). In at least one embodiment, any number of HBM2s 1140 may provide any type and total amount of high bandwidth memory and may be associated with any number (including zero) and type of memory controllers 1142 and HBM PHYs 1144. In at least one embodiment, SPI, I2C, GPIO 1160, PCIe Controller and DMA 1170, and/or PCIe 1180 may be replaced with any number and type of blocks that enable any number and type of communication standards in any technically feasible fashion.

Data analytics logic 415 are used to perform data analytics operations associated with one or more embodiments. Details regarding data analytics logic 415 are provided with FIG. 11. In at least one embodiment, deep learning application processor is used to train a machine learning model, such as a neural network, to predict or infer information provided to deep learning application processor 1100. In at least one embodiment, deep learning application processor 1100 is used to infer or predict information based on a trained machine learning model (e.g., neural network) that has been trained by another processor or system or by deep learning application processor 1100. In at least one embodiment, processor 1100 may be used to perform one or more neural network use cases described herein.

In at least one embodiment, data analytics logic 315 of deep learning application processor 1100 may execute processes and calculations to implement system 100. In at least one embodiment, data analytics logic 415 may retrieve instructions for implementing networks of system 100, as well as their other data stored only in the memory of GPU unit for using system 100 to perform data analytic operations as above.

Figure 12:
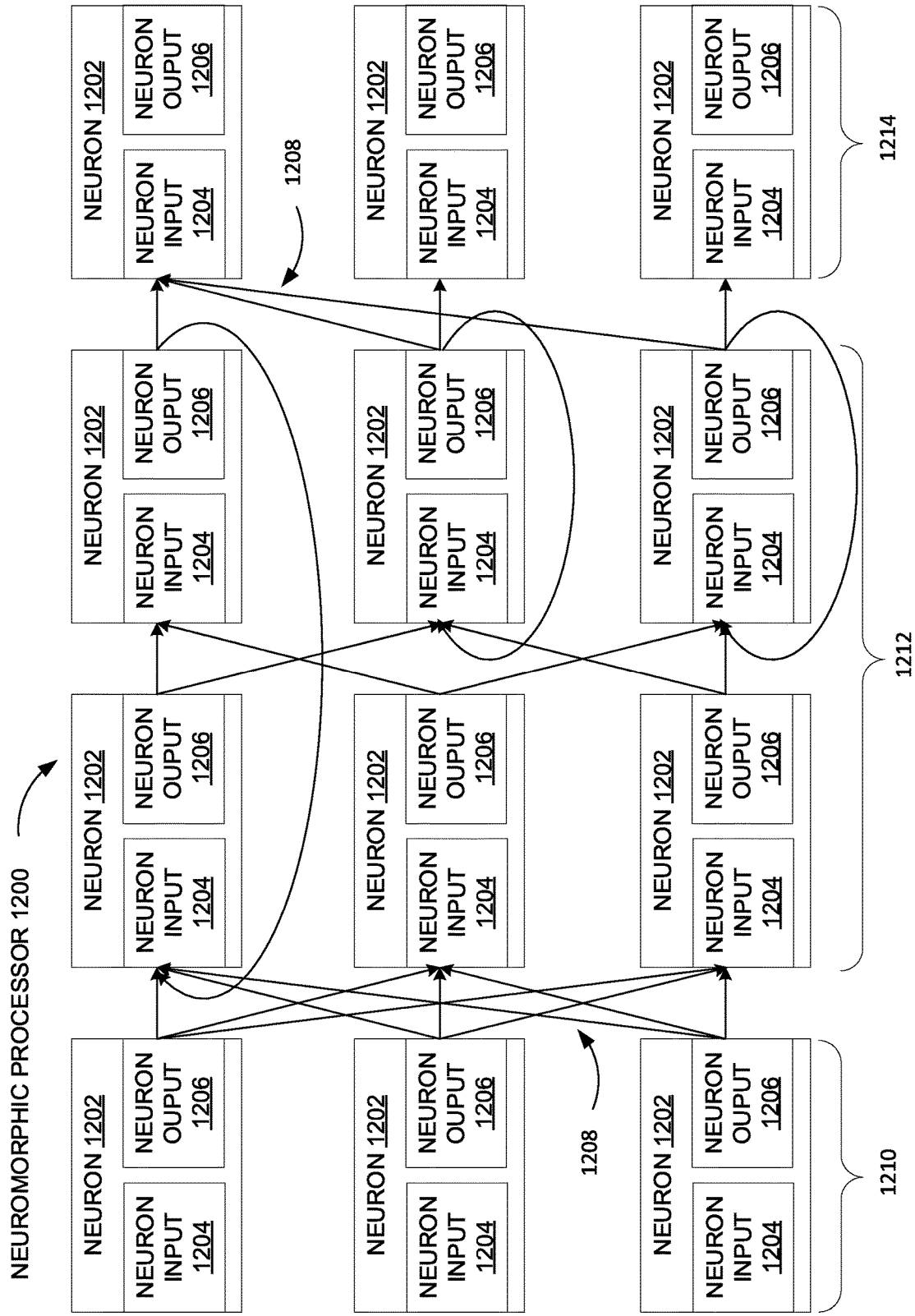
FIG. 12 is a block diagram illustrating an example neuromorphic processor, according to at least one embodiment.

FIG. 12 is a block diagram of a neuromorphic processor 1200, according to at least one embodiment. In at least one embodiment, neuromorphic processor 1200 may receive one or more inputs from sources external to neuromorphic processor 1200. In at least one embodiment, these inputs may be transmitted to one or more neurons 1202 within neuromorphic processor 1200. In at least one embodiment, neurons 1202 and components thereof may be implemented using circuitry or logic, including one or more arithmetic logic units (ALUs). In at least one embodiment, neuromorphic processor 1200 may include, without limitation, thousands or millions of instances of neurons 1202, but any suitable number of neurons 1202 may be used. In at least one embodiment, each instance of neuron 1202 may include a neuron input 1204 and a neuron output 1206. In at least one embodiment, neurons 1202 may generate outputs that may be transmitted to inputs of other instances of neurons 1202. For example, in at least one embodiment, neuron inputs 1204 and neuron outputs 1206 may be interconnected via synapses 1208.

In at least one embodiment, neurons 1202 and synapses 1208 may be interconnected such that neuromorphic processor 1200 operates to process or analyze information received by neuromorphic processor 1200. In at least one embodiment, neurons 1202 may transmit an output pulse (or "fire" or "spike") when inputs received through neuron input 1204 exceed a threshold. In at least one embodiment, neurons 1202 may sum or integrate signals received at neuron inputs 1204. For example, in at least one embodiment, neurons 1202 may be implemented as leaky integrate-and-fire neurons, wherein if a sum (referred to as a "membrane potential") exceeds a threshold value, neuron 1202 may generate an output (or "fire") using a transfer function such as a sigmoid or threshold function. In at least one embodiment, a leaky integrate-and-fire neuron may sum signals received at neuron inputs 1204 into a membrane potential and may also apply a decay factor (or leak) to reduce a membrane potential. In at least one embodiment, a leaky integrate-and-fire neuron may fire if multiple input signals are received at neuron inputs 1204 rapidly enough to exceed a threshold value (i.e., before a membrane potential decays too low to fire). In at least one embodiment, neurons 1202 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 1202 may include, without limitation, comparator circuits or logic that generate an output spike at neuron output 1206 when result of applying a transfer function to neuron input 1204 exceeds a threshold. In at least one embodiment, once neuron 1202 fires, it may disregard previously received input information by, for example, resetting a membrane potential to 0 or another suitable default value. In at least one embodiment, once membrane potential is reset to 0, neuron 1202 may resume normal operation after a suitable period of time (or refractory period).

In at least one embodiment, neurons 1202 may be interconnected through synapses 1208. In at least one embodiment, synapses 1208 may operate to transmit signals from an output of a first neuron 1202 to an input of a second neuron 1202. In at least one embodiment, neurons 1202 may transmit information over more than one instance of synapse 1208. In at least one embodiment, one or more instances of neuron output 1206 may be connected, via an instance of synapse 1208, to an instance of neuron input 1204 in same neuron 1202. In at least one embodiment, an instance of neuron 1202 generating an output to be transmitted over an instance of synapse 1208 may be referred to as a "presynaptic neuron" with respect to that instance of synapse 1208. In at least one embodiment, an instance of neuron 1202 receiving an input transmitted over an instance of synapse 1208 may be referred to as a "post-synaptic neuron" with respect to that instance of synapse 1208. Because an instance of neuron 1202 may receive inputs from one or more instances of synapse 1208, and may also transmit outputs over one or more instances of synapse 1208, a single instance of neuron 1202 may therefore be both a "presynaptic neuron" and "post-synaptic neuron," with respect to various instances of synapses 1208, in at least one embodiment.

In at least one embodiment, neurons 1202 may be organized into one or more layers. Each instance of neuron 1202 may have one neuron output 1206 that may fan out through one or more synapses 1208 to one or more neuron inputs 1204. In at least one embodiment, neuron outputs 1206 of neurons 1202 in a first layer 2110 may be connected to neuron inputs 1204 of neurons 1202 in a second layer 127. In at least one embodiment, layer 1210 may be referred to as a "feed-forward layer." In at least one embodiment, each instance of neuron 1202 in an instance of first layer 1210 may fan out to each instance of neuron 1202 in second layer 127. In at least one embodiment, first layer 1210 may be referred to as a "fully connected feed-forward layer." In at least one embodiment, each instance of neuron 1202 in an instance of second layer 127 may fan out to fewer than all instances of neuron 1202 in a third layer 1214. In at least one embodiment, second layer 127 may be referred to as a "sparsely connected feed-forward layer." In at least one embodiment, neurons 1202 in second layer 127 may fan out to neurons 1202 in multiple other layers, including to neurons 1202 in (same) second layer 127. In at least one embodiment, second layer 127 may be referred to as a "recurrent layer." neuromorphic processor 1200 may include, without limitation, any suitable combination of recurrent layers and feed-forward layers, including, without limitation, both sparsely connected feed-forward layers and fully connected feed-forward layers.

In at least one embodiment, neuromorphic processor 1200 may include, without limitation, a reconfigurable interconnect architecture or dedicated hard wired interconnects to connect synapse 1208 to neurons 1202. In at least one embodiment, neuromorphic processor 1200 may include, without limitation, circuitry or logic that allows synapses to be allocated to different neurons 1202 as needed based on neural network topology and neuron fan-in/out. For example, in at least one embodiment, synapses 1208 may be connected to neurons 1202 using an interconnect fabric, such as network-on-chip, or with dedicated connections. In at least one embodiment, synapse interconnections and components thereof may be implemented using circuitry or logic.

In at least one embodiment, neuromorphic processor 1200 may execute processes and calculations to implement system 100. In at least one embodiment, neuromorphic processor 1200 may retrieve instructions for implementing networks of system 100, as well as other data stored only in the memory of the GPU unit, to use system 100 to perform data analytic operations as above.

Figure 13:
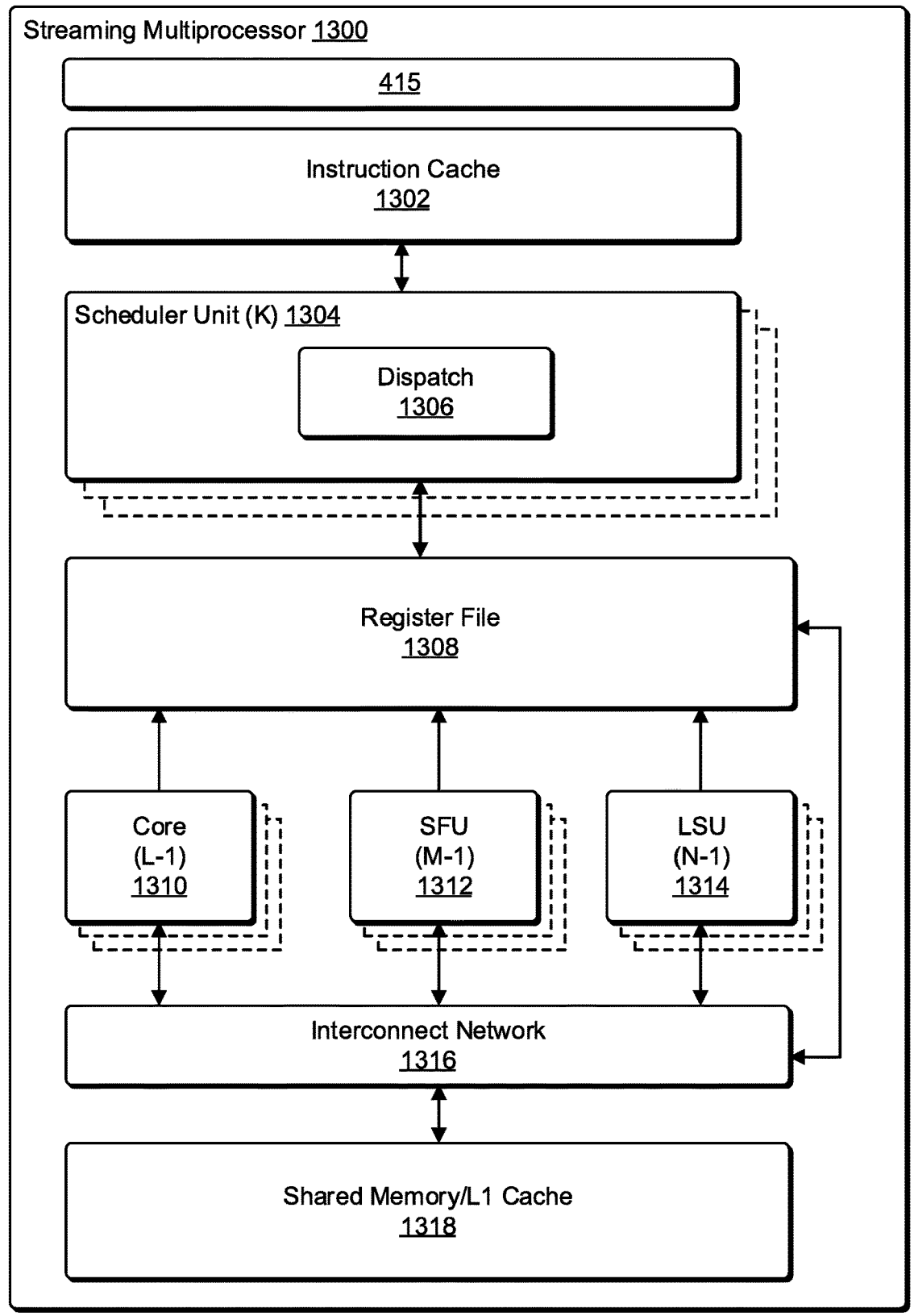
FIG. 13 illustrates a streaming multi-processor, according to at least one embodiment.

FIG. 13 illustrates a streaming multi-processor ("SM") 1300, according to at least one embodiment. In at least one embodiment, SM 1300 is SM of FIG. 28. In at least one embodiment, SM 1300 includes, without limitation, an instruction cache 1302; one or more scheduler units 1304; a register file 1308; one or more processing cores ("cores") 1310; one or more special function units ("SFUs") 137; one or more load/store units ("LSUs") 1314; an interconnect network 1316; a shared memory/level one ("L1") cache 1318; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 1300. In at least one embodiment, scheduler unit 1304 receives tasks from work distribution unit and manages instruction scheduling for one or more thread blocks assigned to SM 1300. In at least one embodiment, scheduler unit 1304 schedules thread blocks for execution as warps of parallel threads, wherein each thread block is allocated at least one warp. In at least one embodiment, each warp executes threads. In at least one embodiment, scheduler unit 1304 manages a plurality of different thread blocks, allocating warps to different thread blocks and then dispatching instructions from plurality of different cooperative groups to various functional units (e.g., processing cores 1310, SFUs 137, and LSUs 1314) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 1306 is configured to transmit instructions to one or more of functional units and scheduler unit 1304 includes, without limitation, two dispatch units 1306 that enable two different instructions from same warp to be dispatched during each clock cycle. In at least one embodiment, each scheduler unit 1304 includes a single dispatch unit 1306 or additional dispatch units 1306.

In at least one embodiment, each SM 1300, in at least one embodiment, includes, without limitation, register file 1308 that provides a set of registers for functional units of SM 1300. In at least one embodiment, register file 1308 is divided between each of functional units such that each functional unit is allocated a dedicated portion of register file 1308. In at least one embodiment, register file 1308 is divided between different warps being executed by SM 1300 and register file 1308 provides temporary storage for operands connected to data paths of functional units. In at least one embodiment, each SM 1300 comprises, without limitation, a plurality of L processing cores 1310. In at least one embodiment, SM 1300 includes, without limitation, a large number (e.g., 78 or more) of distinct processing cores 1310. In at least one embodiment, each processing core 1310, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 1310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 1310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A \times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 1300 comprises, without limitation, M SFUs 137 that perform special functions (e.g., attribute evaluation, reciprocal square root, and like). In at least one embodiment, SFUs 137 include, without limitation, a tree traversal unit configured to traverse a hierarchical tree data structure. In at least one embodiment, SFUs 137 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 1300. In at least one embodiment, texture maps are stored in shared memory/L1 cache 1318. In at least one embodiment, texture units implement texture operations such as filtering operations using mip-maps (e.g., texture maps of varying levels of detail), in accordance with at least one embodiment. In at least one embodiment, each SM 1300 includes, without limitation, two texture units.

Each SM 1300 comprises, without limitation, N LSUs 1314 that implement load and store operations between shared memory/L1 cache 1318 and register file 1308, in at least one embodiment. Each SM 1300 includes, without limitation, interconnect network 1316 that connects each of functional units to register file 1308 and LSU 1314 to register file 1308 and shared memory/L1 cache 1318 in at least one embodiment. In at least one embodiment, interconnect network 1316 is a crossbar that can be configured to connect any of functional units to any of registers in register file 1308 and connect LSUs 1314 to register file 1308 and memory locations in shared memory/L1 cache 1318.

In at least one embodiment, shared memory/L1 cache 1318 is an array of on-chip memory that allows for data storage and communication between SM 1300 and primitive engine and between threads in SM 1300, in at least one embodiment. In at least one embodiment, shared memory/L1 cache 1318 comprises, without limitation, 78 KB of storage capacity and is in path from SM 1300 to partition unit. In at least one embodiment, shared memory/L1 cache 1318, in at least one embodiment, is used to cache reads and writes. In at least one embodiment, one or more of shared memory/L1 cache 1318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 1318 enables shared memory/L1 cache 1318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 1300 to execute program and perform calculations, shared memory/L1 cache 1318 to communicate between threads, and LSU 1314 to read and write global memory through shared memory/L1 cache 1318 and memory partition unit. In at least one embodiment, when configured for general purpose parallel computation, SM 1300 writes commands that scheduler unit 1304 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. graphics card may be configured to interface with a PCIe slot on a motherboard of a desktop computer. In at least one embodiment, PPU may be an integrated graphics processing unit ("iGPU") included in chipset of motherboard.

Data analytic logic 415 are used to perform data analytic operations associated with one or more embodiments. Details regarding data analytic logic 415 are provided below in conjunction with FIG. 13. In at least one embodiment, deep learning application processor is used to train a machine learning model, such as a neural network, to predict or infer information provided to SM 1300. In at least one embodiment, SM 1300 is used to infer or predict information based on a trained machine learning model (e.g., neural network) that has been trained by another processor or system or by SM 1300. In at least one embodiment, SM 1300 may be used to perform one or more neural network use cases described herein.

In at least one embodiment, data analytic logic 415 of SM 1300 may execute processes and calculations to implement system 10. In at least one embodiment, data analytic logic 415 may retrieve instructions for implementing networks of the system 100, as well as other data to use the system 100 to perform data analytic operations as above.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

Other variations are within a spirit of this present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing any below claims.

What is claimed is:

1. A system comprising:
one or more graphics processing units (GPUs) including processing circuitry to:
execute a sequence of processing phases, wherein at least one processing phase of the sequence of processing phases includes using the processing circuitry and data stored in GPU memory of the one or more GPUs to execute an extract operation, a transform operation, and a load operation of at least one extract, transform, and load (ETL) process on raw data to generate structured data, wherein the load operation is to store the structured data in the GPU memory.

2. The system of claim 1, wherein the sequence of processing phases further comprises at least one of: a data application phase, an evaluation phase, or a deployment phase.

3. The system of claim 1, wherein the one or more GPUs include a plurality of GPUs, and the data is shared between the plurality of GPUs using at least one of the GPU memory or one or more additional GPU memories of the plurality of GPUs.

4. The system of claim 1, wherein the extract operation of the ETL process includes the processing circuitry accessing the raw data from one or more unstructured data sources, and the ETL process produces one or more structured data stores from the one or more unstructured data sources.

5. The system of claim 1, wherein the structured data loaded to the GPU memory is accessed by the processing circuitry in at least one other processing phase of the sequence of processing phases subsequent the at least one processing phase.

6. The system of claim 1, wherein the ETL process includes the processing circuitry linking one or more first types of the data to one or more second types of the data.

7. The system of claim 1, wherein the sequence of processing phases corresponds to a pipeline for training or testing one or more machine learning models, statistical algorithms, or deep neural networks.

8. The system of claim 1, wherein, during a deployment phase, the processing circuitry is further to access, from the GPU memory, algorithm data corresponding to a target algorithm and input data for processing using the target algorithm, the algorithm data stored in the GPU memory during a processing phase of the sequence of processing phases prior to the deployment phase.

9. The system of claim 1, wherein the at least one processing phase corresponds to a data ingestion and preparation phase.

10. A graphics processing unit (GPU) comprising:
processing circuitry to execute a sequence of processing phases, wherein at least one processing phase of the sequence of processing phases includes using the processing circuitry and data stored in GPU memory of the GPU to execute an extract operation, a transform operation, and a load operation of at least one extract, transform, and load (ETL) process on raw data to generate structured data, wherein the load operation is to store the structured data in the GPU memory.

11. The GPU of claim 10, wherein the at least one processing phase includes a data ingestion and preparation phase, and the sequence of processing phases further comprises at least one of: a data application phase, an evaluation phase, or a deployment phase.

12. The GPU of claim 10, wherein each processing phase of the sequence of processing phases is executed using a respective logic unit of the GPU, wherein at least one respective logic unit is to share data with one or more other logic units using the GPU memory.

13. The GPU of claim 10, wherein the structured data loaded from the GPU memory is used by at least one other processing phase of the sequence of processing phases subsequent the at least one processing phase.

14. The GPU of claim 10, wherein, during the at least one processing phase of the sequence of processing phases, a plurality of cores of the GPU each execute a parallel operation on an allocated portion of the data stored in the GPU memory.

15. The GPU of claim 10, wherein the sequence of processing phases corresponds to a pipeline for training or testing one or more machine learning models, statistical algorithms, or deep neural networks.

16. A system comprising:
one or more graphics processing units (GPUs) comprising processing circuitry to execute a plurality of processing phases, the plurality of processing phases including:
a first processing phase that uses the processing circuitry and data stored in GPU memory of the one or more GPUs to execute an extract operation, a transform operation, and a load operation of at least one extract, transform, and load (ETL) process on raw data to generate structured data, wherein the load operation is to store the structured data in the GPU memory; and
a second processing phase to perform one or more operations using the structured data loaded to the GPU memory.

17. The system of claim 16, wherein the first processing phase includes a data ingestion and preparation phase, and the second processing phase includes a data application phase.

18. The system of claim 17, wherein the plurality of processing phases further includes at least one of an evaluation phase or a deployment phase.

19. The system of claim 16, wherein each processing phase of the plurality of processing phases is executed using a respective logic unit of the one or more GPUs, wherein at least one respective logic unit is to share data with one or more other logic units using the GPU memory.

20. The system of claim 16, wherein, during at least one processing phase of the plurality of processing phases, a plurality of cores of the one or more GPUs each execute a parallel operation on an allocated portion of the data stored in the GPU memory.

* * * * *